United States Patent
Kato et al.

(10) Patent No.: US 9,742,932 B2
(45) Date of Patent: Aug. 22, 2017

(54) FAX DATA MANAGEMENT SYSTEM, FAX DATA MANAGEMENT METHOD, AND STORAGE MEDIUM

(71) Applicant: CANON KABUSHIKI KAISHA, Tokyo (JP)

(72) Inventors: Natsuki Kato, Kawasaki (JP); Daijiro Miyamoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/098,029

(22) Filed: Apr. 13, 2016

(65) Prior Publication Data
US 2016/0316075 A1   Oct. 27, 2016

(30) Foreign Application Priority Data

Apr. 22, 2015 (JP) .................... 2015-087586

(51) Int. Cl.
| | | |
|---|---|---|
| H04N 1/04 | (2006.01) | |
| H04N 1/00 | (2006.01) | |
| H04N 1/32 | (2006.01) | |

(52) U.S. Cl.
CPC ....... *H04N 1/00206* (2013.01); *H04N 1/0044* (2013.01); *H04N 1/00344* (2013.01); *H04N 1/00411* (2013.01); *H04N 1/32101* (2013.01); *H04N 1/32379* (2013.01); *H04N 2201/0094* (2013.01); *H04N 2201/218* (2013.01)

(58) Field of Classification Search
CPC ........... H04N 1/00206; H04N 1/32101; H04N 1/00411; H04N 1/0044; H04N 1/32379
USPC ........................................ 358/403, 474, 497
See application file for complete search history.

(56) References Cited

U.S. PATENT DOCUMENTS

2014/0293362 A1* 10/2014 Kawakami ........... H04N 1/2166
358/403

FOREIGN PATENT DOCUMENTS

| JP | 2000-069133 | 3/2000 |
| JP | 2009-290730 | 12/2009 |
| JP | 2011-071575 | 4/2011 |

OTHER PUBLICATIONS

U.S. Appl. No. 15/098,019, filed Apr. 13, 2016.
U.S. Appl. No. 15/098,023, filed Apr. 13, 2016.

* cited by examiner

*Primary Examiner* — Houshang Safaipour
(74) *Attorney, Agent, or Firm* — Fitzpatrick, Cella, Harper & Scinto

(57) ABSTRACT

To make it possible to appropriately determine whether to register a number in an address book for fax data from the number not registered in the address book. A fax data management system including: a management unit configured to, in the case where a fax number of received fax data is not registered in address book data, in which a name and a fax number of a source of transmission are registered in association with each other, manage information including at least the fax number of the received fax data as unregistered address information; a display unit configured to display the unregistered address information and an image corresponding to the received fax data of which the fax number is not registered in the address book data; and a registration unit configured to register a fax number selected from the unregistered address information in the address book data, the registered fax number being associated with a name of the source of transmission.

11 Claims, 24 Drawing Sheets

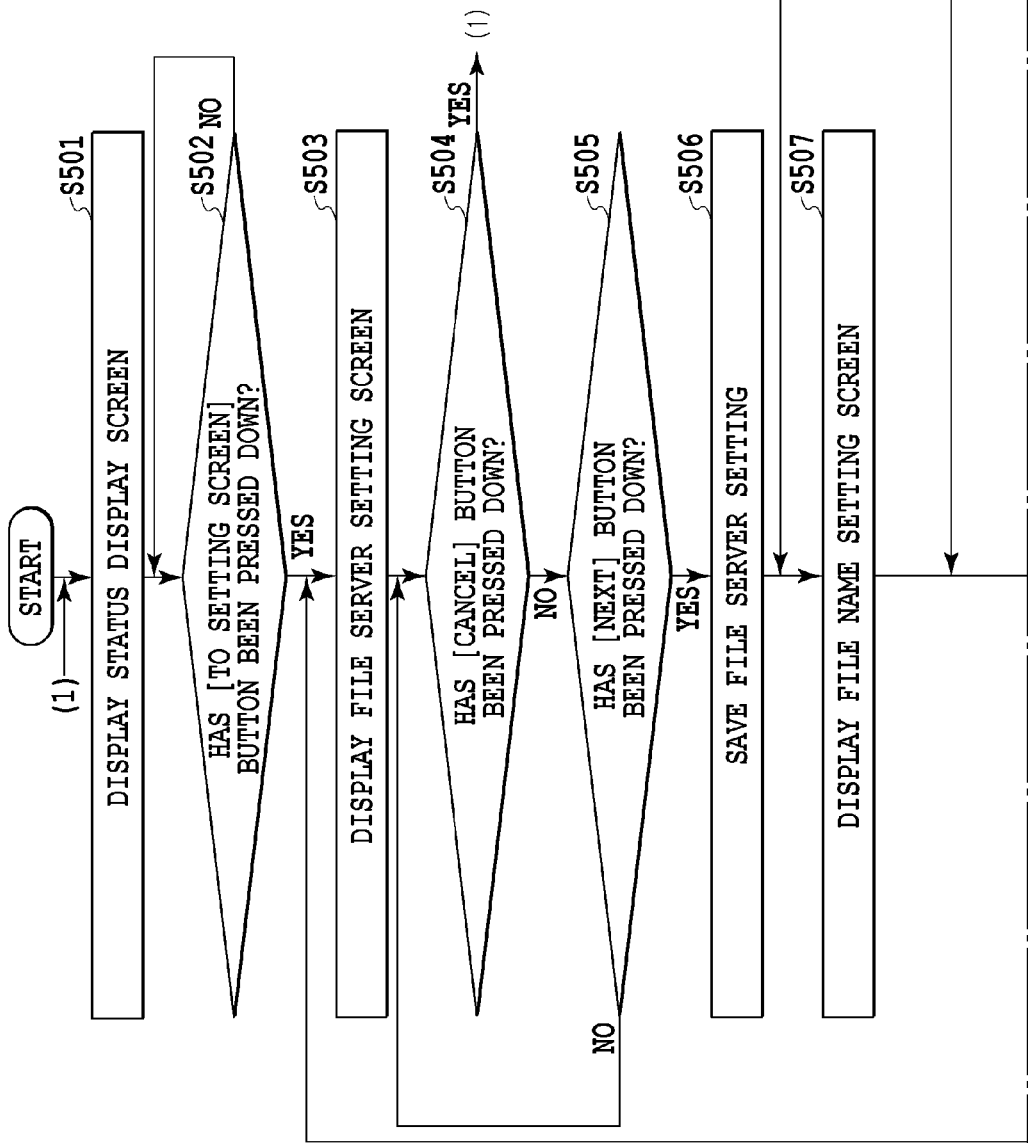

```
hostname,sharedserver ~1101
folderpath,root/ ~1102
username,administrator ~1103
password,32942xc45 ~1104
filenamerule,[REGISTNAME]_[FAXNUMBER]_[DATE&TIME] ~1105
folderrule,[REGISTNAME]/[FAXNUMBER]/[DATE] ~1106
```

FIG.11

| ADDRESS ID | NAME | FAX NUMBER |
|---|---|---|
| 0001 | ABC CORPORATION | 0311112222 |
| 0002 | X & CO., LTD. | 0333334444 |
| 0003 | Y REALTY & DEVELOPMENT CO., LTD. | 0355556666 |
| 0004 | Z BRANCH OFFICE | 0377778888 |
| ... | ... | ... |

| UNREGISTERED ADDRESS LIST | | |
|---|---|---|
| DATE AND TIME OF RECEPTION | FAX NUMBER OF SOURCE OF TRANSMISSION | NUMBER OF PAGES |
| 01/24 10:20 | 0312345678 | 1 |
| 01/23 10:00 | 0312345677 | 2 |
| 01/23 09:00 | 0312345679 | 3 |
| 01/23 08:00 | 0312345680 | 3 |
| 01/22 22:20 | 0312345678 | 3 |
| 01/22 22:00 | 0312345680 | 3 |
| 01/21 10:00 | 0312345680 | 3 |
| 01/21 09:00 | 0312345680 | 3 |
| 01/21 08:00 | 0312345680 | 3 |

PREVIEW

ADDRESS REGISTRATION

RETURN

FAX DATA MANAGEMENT SYSTEM, FAX DATA MANAGEMENT METHOD, AND STORAGE MEDIUM

BACKGROUND OF THE INVENTION

Field of the Invention

The present invention relates to a technique to manage received facsimile (hereinafter, referred to as fax) data.

Description of the Related Art

Conventionally, transferring image data (fax data) received by making use of a fax (G3 fax or Internet fax) or the like automatically to a transfer destination that is set in advance is performed. At this time, in the case where a file server is specified in advance as the transfer destination of the fax data, it is also possible to automatically store the received fax data in a folder within the file server.

Japanese Patent Laid-Open No. 2009-290730 has disclosed storing received fax data automatically in a folder by registering in advance information on the source of transmission of the received fax and the folder, which is the storage destination of the fax data, in association with each other. Due to this mechanism, for example, in the case where a source of transmission A and a folder A are associated with each other, and at the same time, a source of transmission B and a folder B are associated with each other, fax data received from the source of transmission A is automatically stored in the folder A and fax data received from the source of transmission B is automatically stored in the folder B, respectively.

Further, the specific example 1 of Japanese Patent Laid-Open No. 2000-69133 has disclosed the method of automatically registering a telephone number (fax number) included in a transmitting subscriber identification (TSI) signal transmitted from the fax calling side in the number registration table of the incoming call side terminal by making use of the TSI function. Furthermore, the specific example 4 of Japanese Patent Laid-Open No. 2000-69133 has disclosed the technique to check the number later in the case where there is a fax call from a communication partner other than the closed area communication partners in the operation mode (closed area communication) in which transmission and reception of faxes are performed only with specified communication partners. Specifically, the number of the source of transmission included in the TSI signal and the number registered in advance in the closed area communication partner list of the incoming call side terminal are compared and in the case where the number of the source of transmission is included within the list, the call is received and in the case where the number of the source of transmission does not exist, the action to reject the call is performed. Then, in the case of rejecting the call, the number of the caller is registered in the rejected caller's number table, and thereby, it is made possible for a user to give instructions whether to additionally add the number to the closed area communication partner list by referring to the number registered in the rejected caller's number table.

With the technique disclosed in the specific example 4 of Japanese Patent Laid-Open No. 2000-69133, the reception of the fax from the number that is not registered in the closed area communication partner list is rejected, and therefore, it is not possible to know what kind of image data is transmitted from the number of the caller. Consequently, a user is obliged to determine whether to additionally add the number to the closed area communication partner list by referring to only the number registered in the rejected caller's number table, and therefore, there is a case where the user cannot perform determination appropriately.

SUMMARY OF THE INVENTION

A fax data management system according to the present invention includes a management unit configured to, in the case where the fax number of received fax data is not registered in address book data in which the name and the fax number of the source of transmission are registered in association with each other, manage information including at least the fax number of the received fax data as unregistered address information, a display unit configured to display the unregistered address information and an image corresponding to the received fax data of which the fax number is not registered in the address book data, and a registration unit configured to register a fax number selected from the unregistered address information in the address book data, the registered fax number being associated with a name of the source of transmission.

Further features of the present invention will become apparent from the following description of exemplary embodiments (with reference to the attached drawings).

BRIEF DESCRIPTION OF THE DRAWINGS

FIG. 11 is a diagram showing an example of contents that are set as a "transfer/printing setting";

FIG. 12 is a diagram showing an example of registered contents of an address book;

FIG. 17 is a diagram showing an example of an Unregistered address list screen;

FIG. 19 is a diagram showing an example of an Address registration screen;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
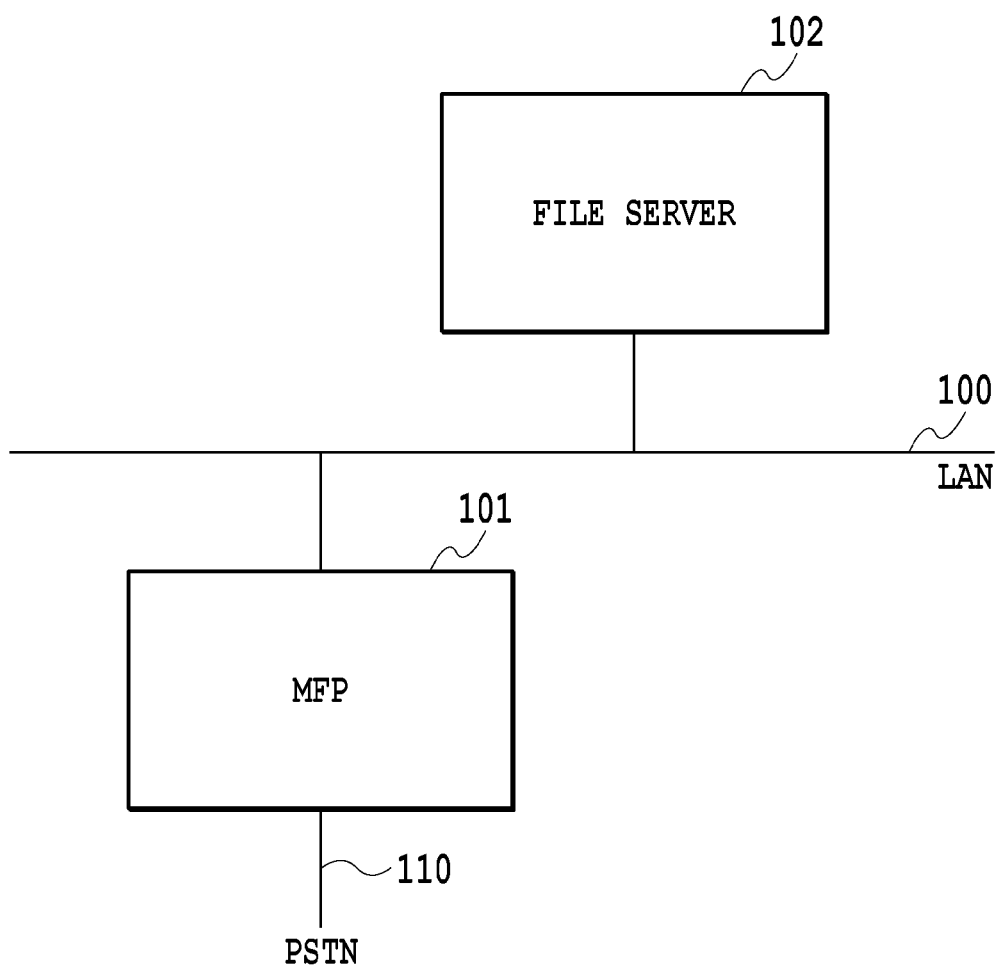
FIG. 1 is a diagram showing a configuration example of a fax data management system.

First, a first embodiment of the present invention is explained. FIG. 1 is a diagram showing a configuration example of a fax data management system according to the present embodiment. In the fax data management system shown in FIG. 1, an MFP 101 equipped with a plurality of functions, such as the fax function and the copy function, and a file server 102 are connected to each other via a LAN 100 so as to be capable of communication. In the present embodiment, both the MFP 101 and the file server 102 constitute the fax data management system, but a configuration in which the MFP 101 also has the function of the file server 102 may be accepted.

The MFP 101 is connected to PSTN (Public Switched Telephone Networks) 110 and is capable of performing fax communication of image data with a fax machine, not shown.

Figure 2:
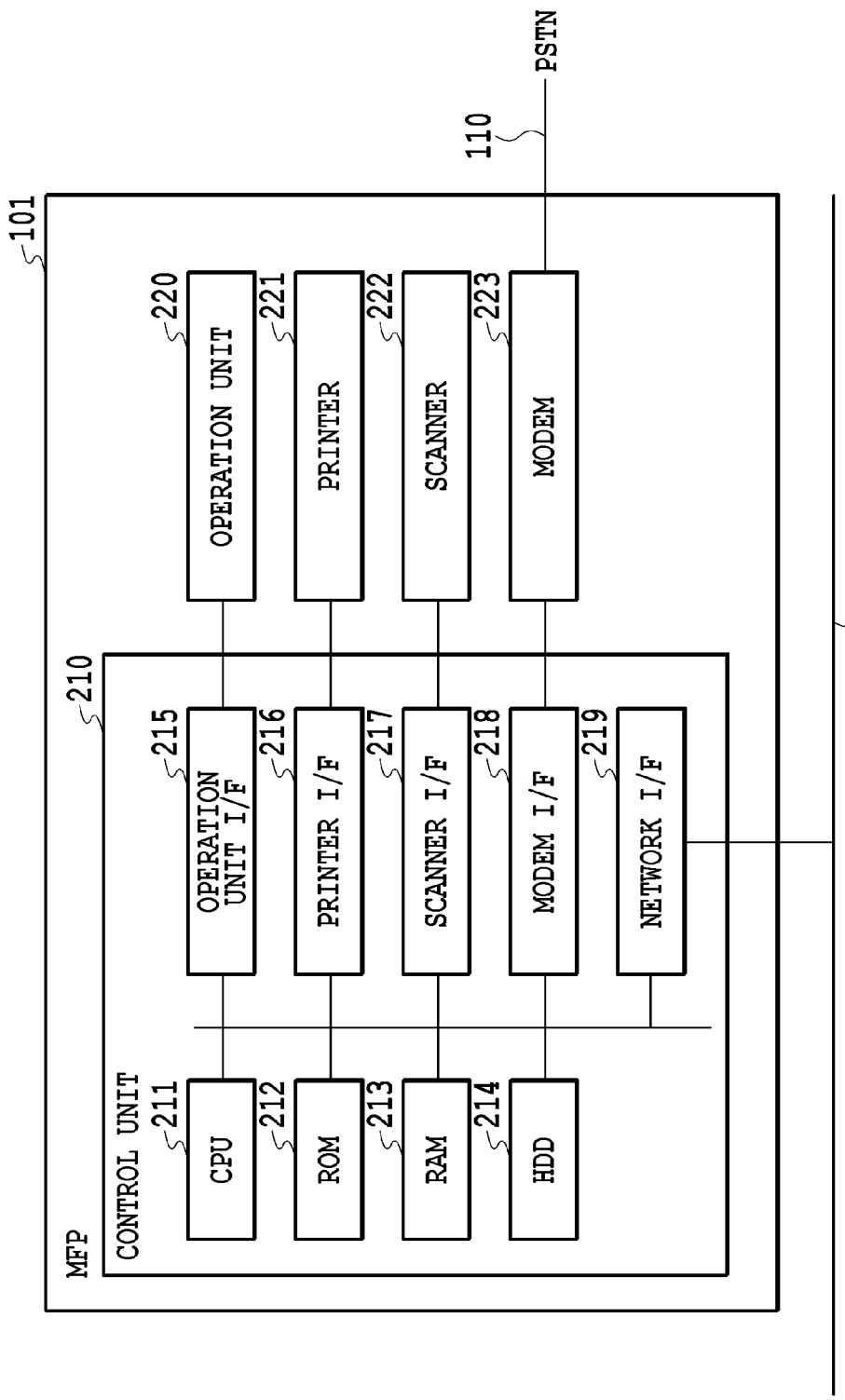
FIG. 2 is a diagram showing an example of a hardware configuration of an MFP.

FIG. 2 is a diagram showing an example of the hardware configuration of the MFP 101. A control unit 210 including a CPU 211 controls the entire operation of the MFP 101. The CPU 211 reads control programs that are stored in a ROM 212 and performs various kinds of control, such as read, printing, and communication. A RAM 213 is used as a main memory of the CPU 211 and a temporary storage area, such as a work area. In the MFP 101, it is assumed that the one CPU 211 performs each piece of processing shown in a flowchart, to be described later, by using one memory (the RAM 213 or an HDD 214), but it may also be possible to perform each piece of processing by causing a plurality of CPUs or a plurality of RAMS or HDDs to cooperate with one another.

The HDD 214 stores image data and various programs. An operation unit I/F 215 is an interface that connects an operation unit 220 and the control unit 210. The operation unit 220 includes a liquid crystal display unit having a touch panel function, a button board, etc., and plays a role as a reception unit configured to receive an operation, an input, and instructions from a user.

A printer I/F 216 is an interface that connects a printer 221 and the control unit 210. Image data that is printed by the printer 221 is transferred from the control unit 210 via the printer I/F 216 and is printed on a printing medium by the printer 221.

A scanner I/F 217 is an interface that connects a scanner 222 and the control unit 210. The scanner 222 reads the image of a document that is set on a document table or the like, not shown, and generates image data and inputs the image data to the control unit 210 via the scanner I/F 217.

It is possible for the MFP 101 to transmit the image data generated by the scanner 222 by file transmission or as attached data of a mail.

A modem I/F 218 is an interface that connects a modem 223 and the control unit 210. The modem 223 performs fax communication of image data with a fax machine, not shown. A network I/F 219 is an interface that connects the control unit 210 (MFP 101) to the LAN 100. It is possible for the MFP 101 to transmit image data and information to an external device (the file server 102 or the like) on the LAN 100 and to receive various kinds of information by using the network I/F 219.

Figure 3:
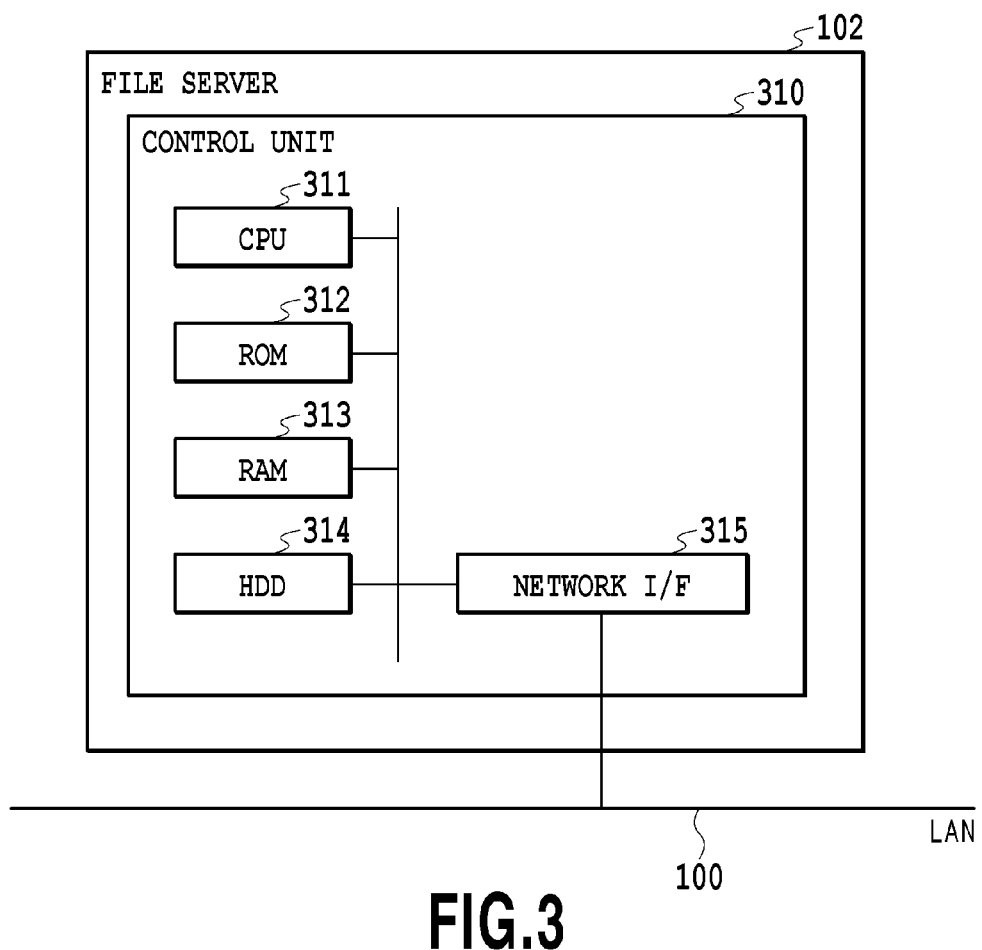
FIG. 3 is a diagram showing an example of a hardware configuration of a file server.

FIG. 3 is a diagram showing an example of the hardware configuration of the file server 102. A control unit 310 including a CPU 311 controls the entire operation of the file server 102. The CPU 311 reads control programs that are stored in a ROM 312 and performs various kinds of control processing. A RAM 313 is used as a main memory of the CPU 311 and a temporary storage area, such as a work area. An HDD 314 stores image data and various programs.

A network I/F 315 is an interface that connects the control unit 310 (the file server 102) to the LAN 100. The file server 102 performs transmission and reception of various kinds of information with another device on the LAN 100 by using the network I/F 315.

Figure 4:
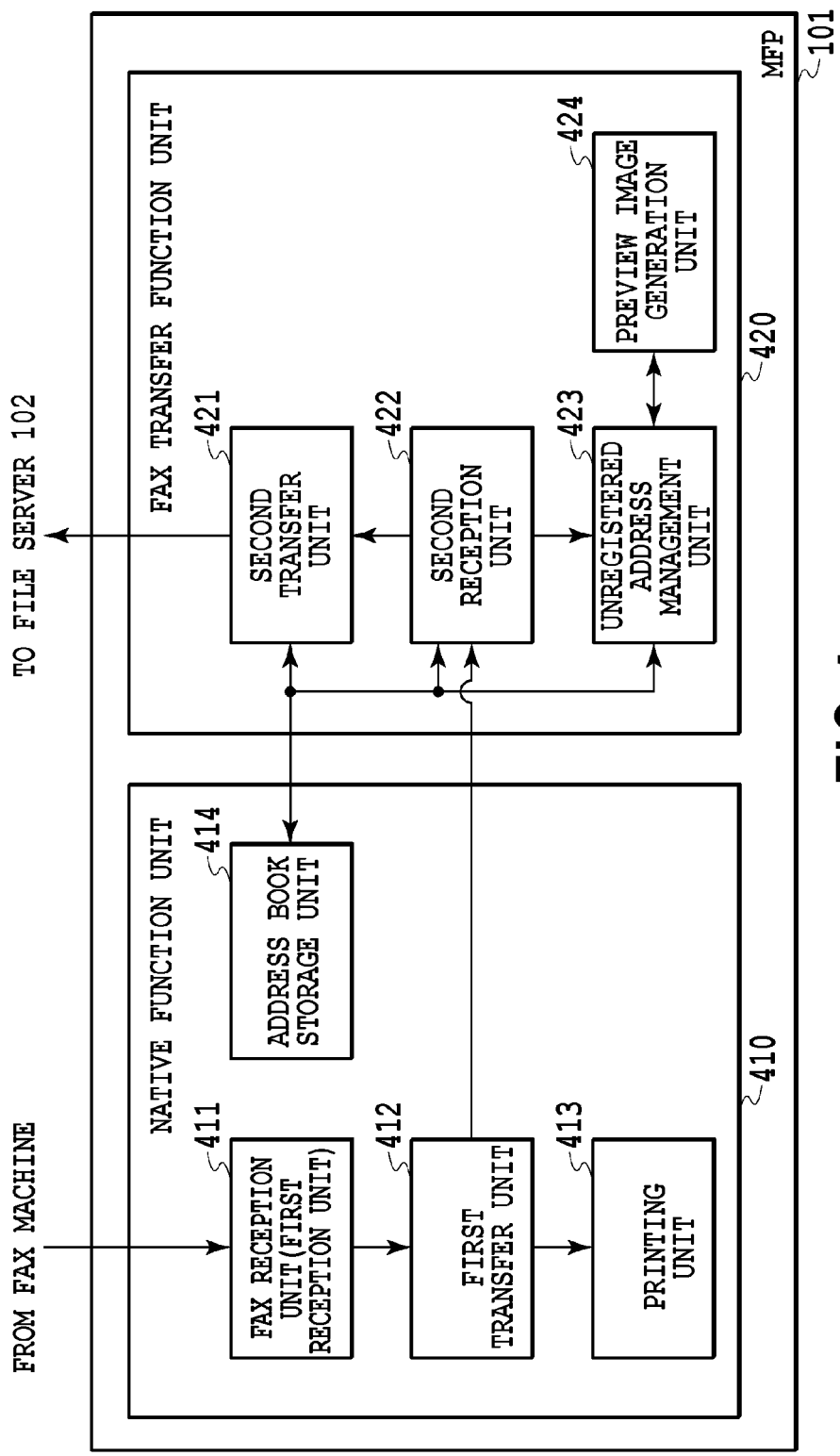
FIG. 4 is a diagram showing an example of a software configuration of functions relating to printing and storing of received fax data in a file server.

FIG. 4 is a diagram showing an example of the software configuration of the functions relating to printing of received fax data and storing of received fax data in the file server 102 among the functions of the MFP 101. Printing and storing of received fax data in the file server 102 are implemented by two function units, i.e., a native function unit 410 and a fax transfer function unit 420, which is an additional function unit. In the case of the present embodiment, while each unit included in the native function unit 410 is provided to the MFP 101 as the standard, each unit included in the fax transfer function unit 420 is provided to the MFP 101 by an application for each unit being additionally installed. The fax transfer function unit 420 is implemented by an application based on Java (registered trademark) and addition of a function to the MFP 101 can be easily implemented. Another application, not shown, may be further installed on the MFP 101.

A fax reception unit (first reception unit) 411 receives image data that is transmitted via the PSTN 110 by fax. The fax reception unit 411 delivers the image data (fax data) received by fax to a first transfer unit 412 after converting the image data into data in the PDF format. At this time, the fax reception unit 411 creates a control file including information on the source of transmission of the fax data (fax number of the source of transmission), the date and time of reception of the fax data, etc., and delivers the control file to the first transfer unit 412 along with the fax data. Here, the fax number of the source of transmission is the fax number indicating a caller, which is included in the TSI signal that is transmitted from, for example, the calling side, but the fax number may be a fax number of the calling side that can be acquired by another method.

The first transfer unit 412 transfers the fax data received from the fax reception unit 411 in accordance with a condition that is set in advance. As the transfer destination of the fax data, it is possible to set a printing unit 413, the file server 102, a PC (not shown) on the LAN 100, etc., but here, it is assumed that a setting is performed so that all the fax data received by the fax reception unit 411 is once transferred to the fax transfer function unit 420. The first transfer unit 412 has an FTP (File Transfer Protocol) client function and also transfers the fax data by FTP to a second reception unit 422 having an FTP server function. The control file created by the fax reception unit 411 is also transferred by FTP to the second reception unit 422 along with the fax data.

The printing unit 413 forms an image on a sheet in accordance with the fax data or the like received from the first transfer unit 412 and outputs the sheet.

An address book storage unit 414 stores address information in which the name of each source of transmission, which is specified by a user of the MFP 101, and the fax number, which is identification information thereon, are associated with each other as address book data. Details of the address book data that is stored in the address book storage unit 414 will be described later.

The second reception unit 422 receives fax data internally transferred from the first transfer unit 412 and delivers the fax data to a second transfer unit 421. At this time, the second reception unit 422 refers to the address book data stored in the address book storage unit 414, and in the case where the fax number of the source of transmission that is included in the control file created by the fax reception unit 411 is not included in the address book data, requests an unregistered address management unit 423 to save and manage the fax number as unregistered address information. At this time, it may also be possible to save together another piece of information (date and time of reception, number of pages, name of source of transmission, etc.) included in the control file. The second transfer unit 421 transfers (transmits) the fax data to the file server 102 in accordance with a transfer setting, to be described later. For the transfer here, it is possible to use SMB (Server Message Block), WebDAV (Distributed Authoring and Versioning protocol for the WWW), etc., besides FTP. Further, the second transfer unit 421 is permitted to access the address book storage unit 414 and acquires a registered name, to be described later.

The unregistered address management unit 423 saves and manages information, such as the fax number, which is determined not to be registered in the address book data by the second reception unit 422, of the source of transmission and the name of the source of transmission as the above-described unregistered address information. Further, upon receipt of instructions of a user to register the fax number or the like managed as unregistered address information in the address book data, the unregistered address management unit 423 prompts a user to input information necessary for registration and registers the fax number or the like in the address book data in accordance with the input information. In the case where the registration in the address book data is completed, the unregistered address management unit 423 deletes the unregistered address information corresponding to the registered fax number from the unregistered address management unit 423.

A preview image generation unit 424 generates preview image data for a preview display from the fax data received by the unregistered address management unit 423 from the second reception unit 422. In the present embodiment, it is assumed that preview image data is generated for fax data relating to the fax number that is managed as unregistered address information in the unregistered address management unit 423. However, preview image data may be generated for all the received fax data. The generated preview image data is stored in an area (preview image saving area) for saving preview image data within the HDD 214. To the preview image saving area, an upper limit of capacity is set in advance, and therefore, the number of pieces of preview image data that can be stored is limited.

Figure 5B:
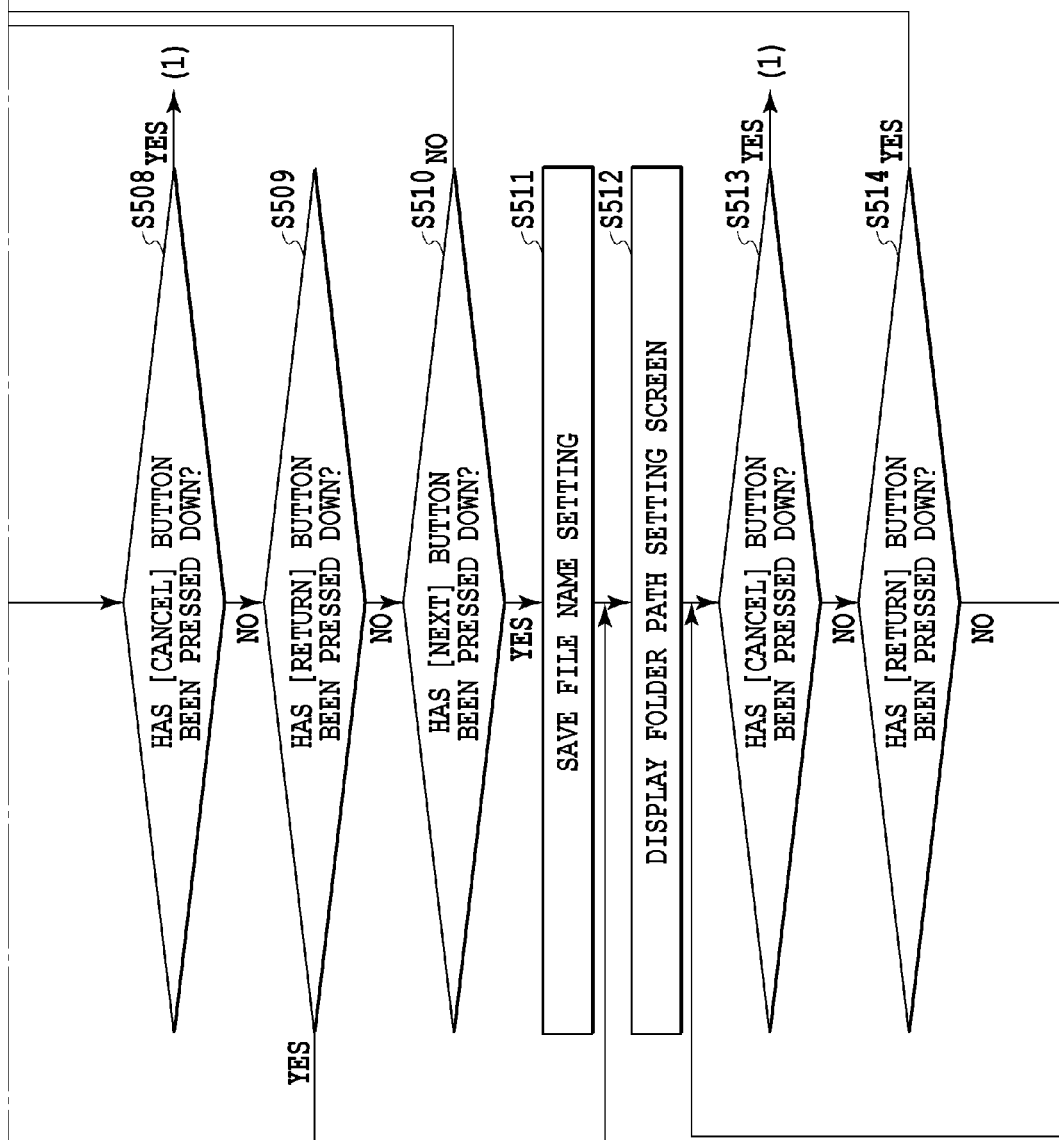
FIG. 5 is a diagram showing a relationship between FIGS. 5A to 5C, and FIGS. 5A to 5C are flowcharts showing a flow of setting processing to transfer fax data received by an MFP to a file server.
Figure 5C:
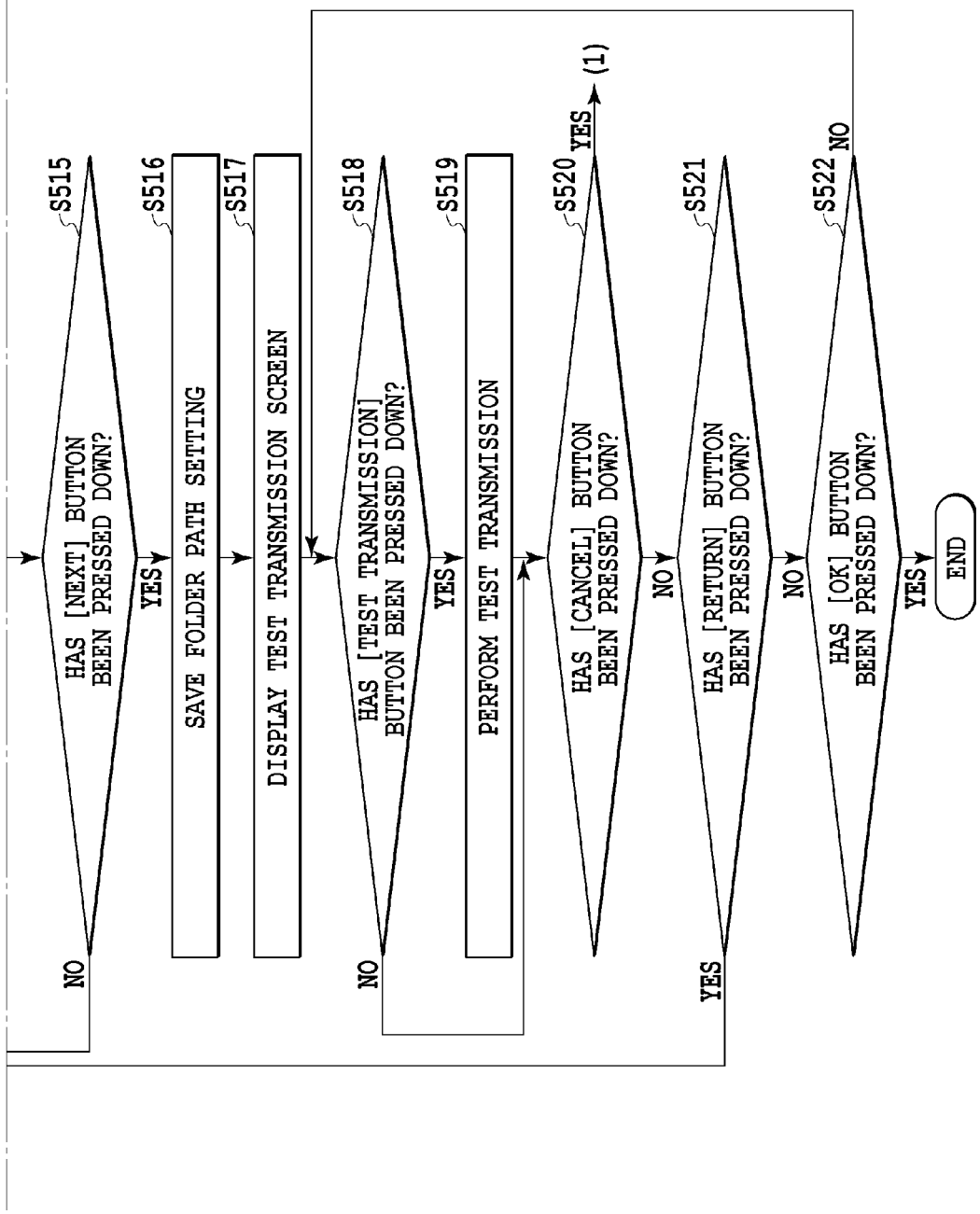

FIGS. 5A to 5C are flowcharts showing a flow of setting processing to transfer fax data received by the MFP 101 to the file server 102. The series of processing is implemented by the CPU 211 executing the control program stored in the HDD 214 after developing the control program onto the RAM 213.

Figure 6:
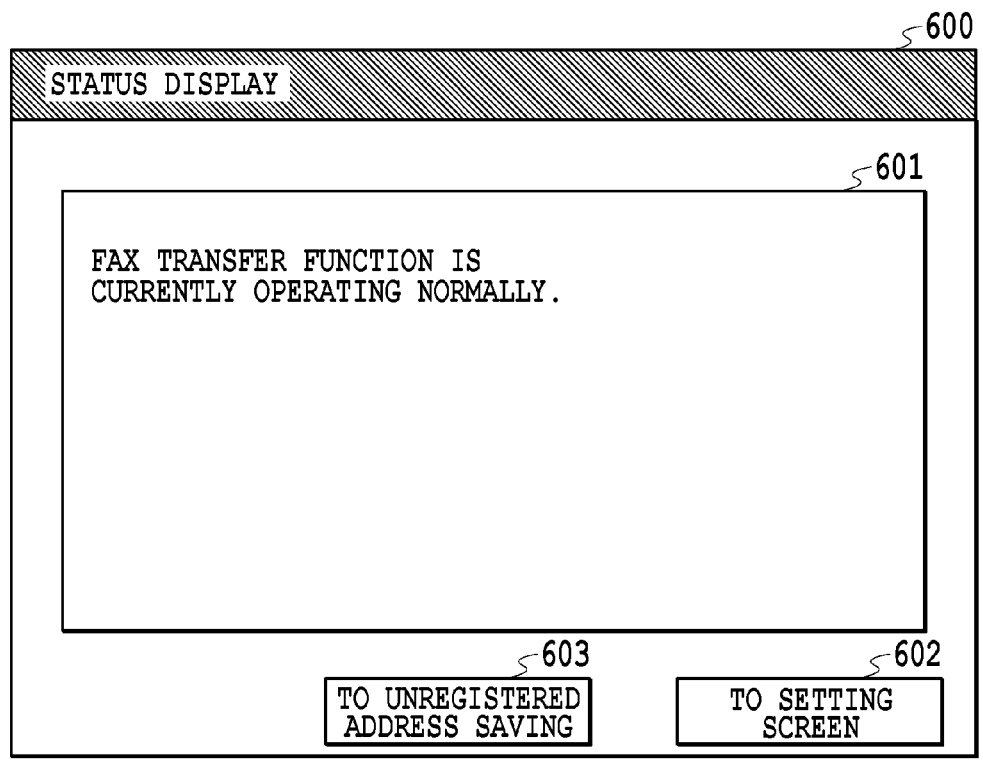
FIG. 6 is a diagram showing an example of a Status display screen.

First, at step 501, a status display screen is displayed on the operation unit 220. FIG. 6 is a diagram showing an example of a status display screen. In a status display area 601 on a Status display screen 600, a message indicating the current operation status of the fax transfer function unit 420 is displayed. The example in FIG. 6 shows that the fax transfer function unit 420 is currently operating normally. In the case where, for example, the transfer of fax data to the file server 102 has failed, or in the case of the state where the fax transfer function unit 420 does not operate normally, a message indicating the fact is displayed in the status display area 601. It may also be possible to further provide an operation button for updating the display contents in the status display area 601 within the Status display screen 600.

At step 502, whether or not a [To setting screen] button 602 on the Status display screen 600 has been pressed down is determined. Here, the processing stands by until the [To setting screen] button 602 is pressed down and in the case where it is determined that the [To setting screen] button 602 has been pressed down, the processing proceeds to step 503. Processing in the case where a [To unregistered address saving] button 603 within the Status display screen 600 is pressed down is not included in this flow, but this will be described later. On the Status display screen 600 shown in FIG. 6, the two buttons ([To setting screen] button 602 and [To unregistered address saving] button 603) are provided, but it may also be possible to provide, for example, a button for making a direct transition into each setting screen (e.g., FIG. 7 to FIG. 9), to be described later.

Figure 7:
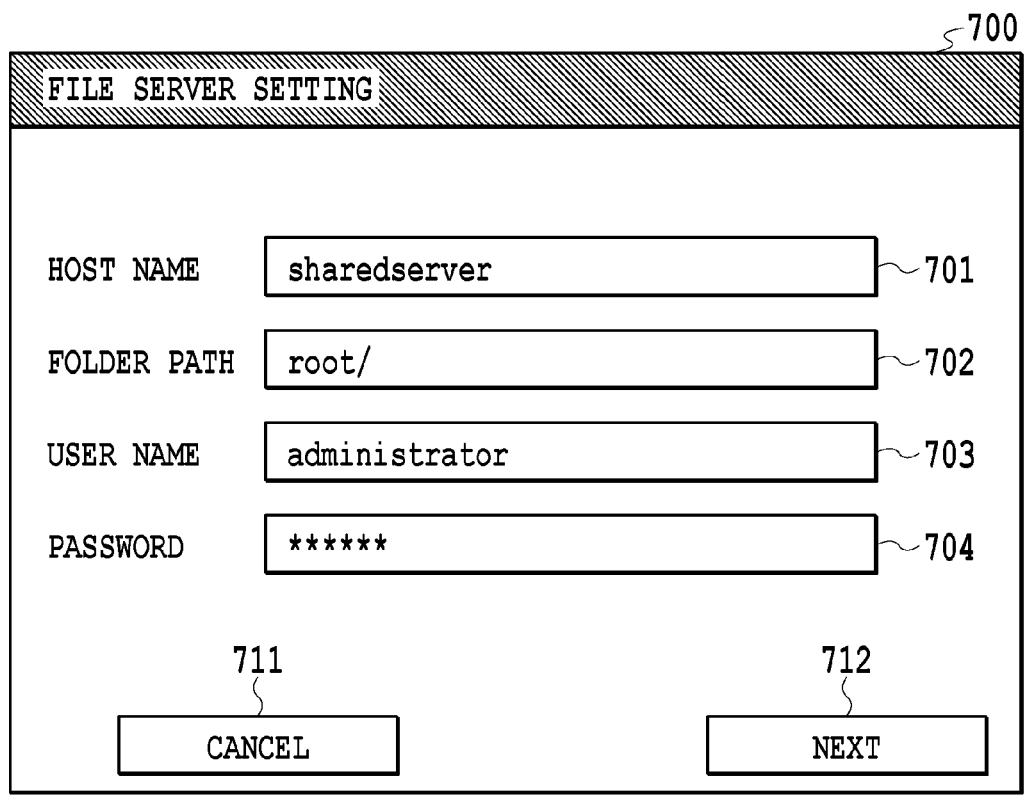
FIG. 7 is a diagram showing an example of a File server setting screen.

At step 503, a file server setting screen is displayed on the operation unit 220. FIG. 7 is a diagram showing an example of a file server setting screen. A user of the MFP 101 inputs information for specifying the file server 102 and information for accessing the file server 102 via a File server setting screen 700 shown in FIG. 7. Specifically, in a Host name input box 701, the host name of the file server 102 is input. In a Folder path input box 702, the starting point of a folder path for specifying the storage destination of received fax data is input. In a User name input box 703 and in a Password input box 704, authentication information (user name and password) necessary to log in to the file server 102 is input.

At step 504, whether or not a [Cancel] button 711 within the File server setting screen 700 has been pressed down is determined. In the case where the [Cancel] button 711 has been pressed down, the processing returns to step 501 and the Status display screen 600 is displayed. In the case where the [Cancel] button 711 has not been pressed down, the processing proceeds to step 505 and whether or not a [Next] button 712 has been pressed down is determined. Then, in the case where the [Next] button 712 has been pressed down, the processing proceeds to step 506. In the case where the [Next] button 712 has not been pressed down, the processing returns to step 504.

At step 506, the contents of the file server settings that are input to the input boxes 701 to 704 within the File server setting screen 700 are saved in the HDD 214.

Figure 8:
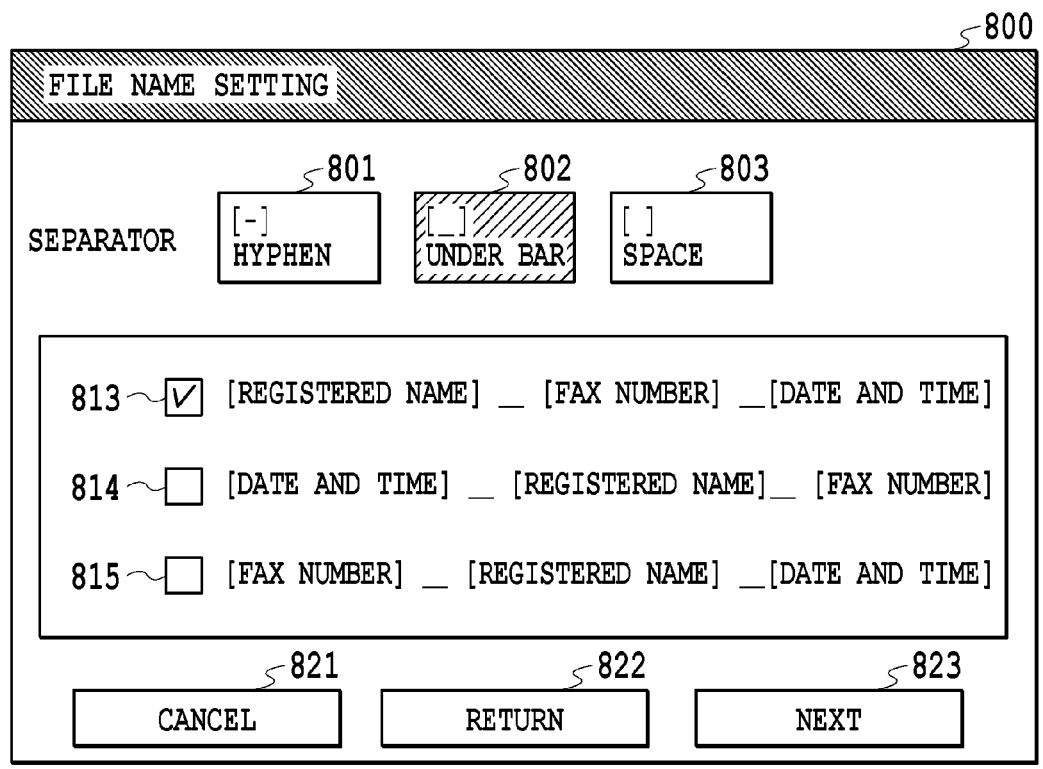
FIG. 8 is a diagram showing an example of a File name setting screen.

At step 507, a file name setting screen is displayed on the operation unit 220. FIG. 8 is a diagram showing an example of a file name setting screen. A user of the MFP 101 specifies a setting rule of a file name that is set to fax data to be transferred to the file server 102 via a File name setting screen 800 shown in FIG. 8. It is possible to set a file name, which is a combination of three kinds of information, i.e., [registered name], [fax number], and [date and time], to the fax to be transferred to the file server 102 by the fax transfer function unit 420. [registered name] is the name registered in advance in the address book in association with the fax number of the source of transmission of the fax data. [fax number] is the fax number of the source of transmission of the fax data. [date and time] is the date and time of reception of the fax data. It is possible for a user of the MFP 101 to select a separator (delimiter) for separating the above-described three kinds of information by using operation buttons 801 to 803. In the case where the operation button 801 is pressed down, [—] (hyphen) is selected. In the case where the operation button 802 is pressed down, [_] (under bar) is selected. In the case where the operation button 803 is pressed down, [ ] (space) is selected. It is known that [_] (under bar) is selected in the example shown schematically. Further, it is also possible for a user of the MFP 101 to specify the order of the above-described three kinds of information by using checkboxes 813 to 815. Here, in the case of the checkbox 813, a file name, which is a combination of the above-described three kinds of information in the order of [registered name], [fax number], and [date and time], is set as a result. For example, in the case where the registered name is "ABC Corporation", the fax number is "03-1111-2222", and the date and time is "2013/01/01 12:15:10 (in the case where the format is "YYYY/MM/DD HH:MM:SS)", a file name of "ABC Corporation_0311112222_20130101121510.PDF" is set. Similarly, in the case of the checkbox 814, a file name, which is a combination of the three kinds of information in the order of [date and time], [registered name], and [fax number], is set. Further, in the case of the checkbox 815, a file name, which is a combination of the three kinds of information in the order of [fax number], [registered name], and [date and time], is set. Here, all the permutations are not taken to be candidates (only part of the permutations are taken to be candidates), but it may also be possible to display all the permutations as candidates.

At step 508, whether or not a [Cancel] button 821 within the File name setting screen 800 has been pressed down is determined. In the case where the [Cancel] button 821 has been pressed down, the processing returns to step 501 and the Status display screen 600 is displayed. In the case where the [Cancel] button 821 has not been pressed down, the processing proceeds to step 509 and whether or not a [Return] button 822 has been pressed down is determined. Then, in the case where the [Return] button 822 has been pressed down, the processing returns to step 503 and the File server setting screen 700 is displayed. In the case where the [Return] button 822 has not been pressed down, the processing proceeds to step 510 and whether or not a [Next] button 823 has been pressed down is determined. Then, in the case where the [Next] button 823 has been pressed down, the processing proceeds to step 511. In the case where the [Next] button 823 has not been pressed down, the processing returns to step 508.

At step 511, the contents specified via the Filename setting screen 800 are saved in the HDD 214.

Figure 9:
FIG. 9 is a diagram showing an example of a Folder path setting screen.

At step 512 that follows, a Folder path setting screen 900 is displayed on the operation unit 220. FIG. 9 is a diagram showing an example of the folder path setting screen. A user of the MFP 101 specifies a setting rule of a folder path for specifying a folder, which is the storage destination of fax data via, via the Folder path setting screen 900 shown in FIG. 9. Here, in the case where a checkbox 901 is checked, fax data is stored in the folder specified by selection boxes 911 to 913 and in the case where the checkbox 901 is not checked, fax data is stored in the area indicated by Folder path 702 on the File server setting screen 700. In the selection box 911, the type of information that is used as a folder name of First hierarchy (the highest hierarchy of the three hierarchies) is specified. A user of the MFP 101 selects the type of information from among the candidates of [registered name], [fax number], and [date] presented in a pull-down menu. In the selection box 912, the type of information that is used as a folder name of Second hierarchy (the middle hierarchy of the three hierarchies) is specified. A user of the MFP 101 selects the type of information from among the candidates of [registered name], [fax number], and [date] presented in a pull-down menu as in the case of First hierarchy. In the selection box 913, the type of information that is used as a folder name of Third hierarchy (the lowest hierarchy of the three hierarchies) is specified. As in the case of First hierarchy, a user of the MFP 101 selects the type of information from among the candidates of [registered name], [fax number], and [date] presented in a pull-down menu. It is also possible to leave the selection boxes 911 to 913 in the state where no type is selected, and in this case, the fax data is stored, for example, within the folder specified in the selection box 912. In a display box 914, the order of various kinds of information in accordance with the selection for each hierarchy in the selection boxes 911 to 913 is displayed. In the example in FIG. 9, it is known that the folder name of First hierarchy is [registered name], the folder name of Second hierarchy is [fax number], and the folder name of Third hierarchy is [date]. By attaching the folder path shown in the display box 914 to the end of the character string specified in Folder path 702 on the File server setting screen 700, a final folder path is completed. For example, in the case where the registered name is "ABC Corporation", the fax number is "03-1111-2222", and the date is "2013/01/01", a folder path of "root/ABC Corporation/0311112222/20130101" is set as a result.

At step 513, whether or not a [Cancel] button 921 within the Folder path setting screen 900 has been pressed down is determined. In the case where the [Cancel] button 921 has been pressed down, the processing returns to step 501 and the Status display screen 600 is displayed. In the case where the [Cancel] button 921 has not been pressed down, the processing proceeds to step 514 and whether or not a [Return] button 922 has been pressed down is determined. Then, in the case where the [Return] button 922 has been pressed down, the processing returns to step 507 and the File name setting screen 800 is displayed. In the case where the [Return] button 922 has not been pressed down, the processing proceeds to step 515 and whether or not a [Next] button 923 has been pressed down is determined. Then, in the case where the [Next] button 923 has been pressed down, the processing proceeds to step 516. In the case where the [Next] button 923 has not been pressed down, the processing returns to step 513.

At step 516, the contents specified via the Folder path setting screen 900 are saved in the HDD 214.

Figure 10:
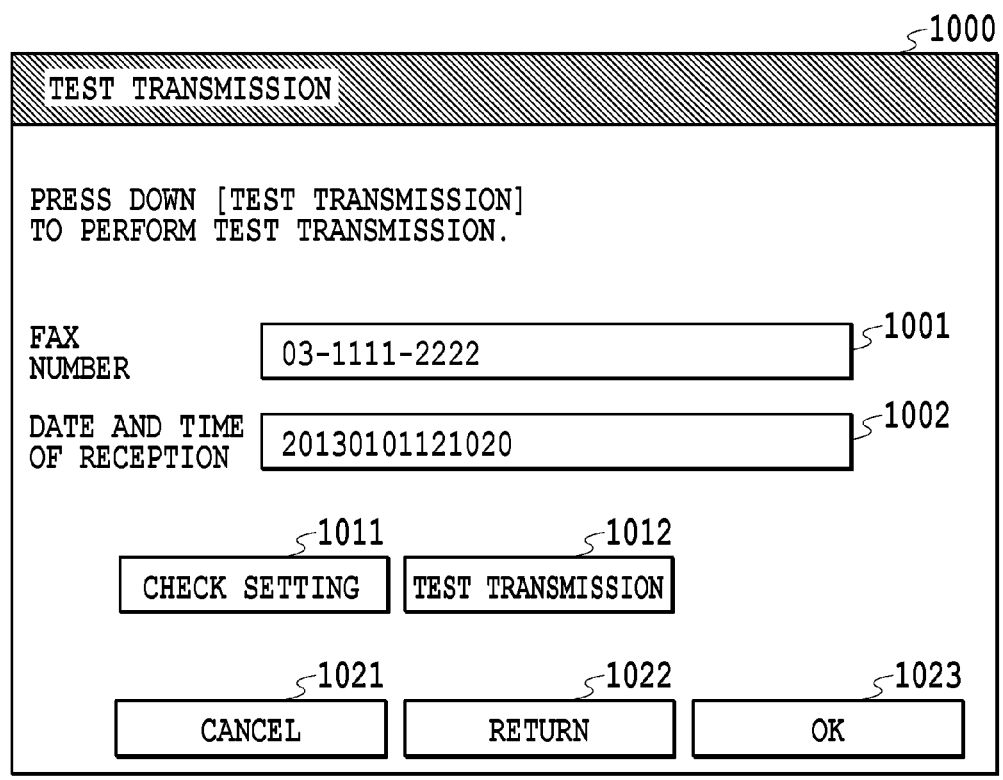
FIG. 10 is a diagram showing an example of a Test transmission screen.

At step 517 that follows, a test transmission screen is displayed on the operation unit 220. FIG. 10 is a diagram showing an example of a test transmission screen. It is possible for a user of the MFP 101 to perform test transmission to the file server 102 via a Test transmission screen 1000 shown in FIG. 10. In a Fax number input box 1001 within the Test transmission screen 1000, the fax number of an arbitrary source of transmission that is used for test transmission is input. Further, in a Date and time of reception input box 1002, an arbitrary date and time of reception that is used for test transmission is input. Although omitted in the present flowchart, by pressing down a [Setting check] button 1011, based on the settings performed in the Fax number input box 1001, in the Date and time of reception input box 1002, and on each screen in FIGS. 9 to 11 described previously, in which folder and with which name the fax data is stored is displayed. Due to this, it is possible for a user to check the contents of the settings.

At step 518, whether or not a [Test transmission] button 1012 within the Test transmission screen 1000 has been pressed down is determined. In the case where the [Test transmission] button 1012 has been pressed down, the processing proceeds to step 519 and in the case where the [Test transmission] button 1012 has not been pressed down, the processing proceeds to step 520.

At step 519, test transmission is performed based on the contents that are input in the Fax number input box 1001 and in the Date and time of reception input box 1002, and the contents of the settings performed on the screens in FIG. 7 to FIG. 9. In the test transmission, test image data that is held in advance within the fax transfer function unit 420 (within the HDD 214) is transmitted to the file server 102 actually. Due to the execution of the test transmission, it is possible for a user to check that fax data is stored normally in the folder of the file server 102. It may also be possible to display a screen to show the results of test transmission after performing the test transmission.

At step 520, whether or not a [Cancel] button 1021 within the Test transmission screen 1000 has been pressed down is determined. In the case where the [Cancel] button 1021 has been pressed down, the processing returns to step 501 and the Status display screen 600 is displayed. In the case where the [Cancel] button 1021 has not been pressed down, the processing proceeds to step 521 and whether or not a [Return] button 1022 has been pressed down is determined. Then, in the case where the [Return] button 1022 has been pressed down, the processing returns to step 512 and the Folder path setting screen 900 is displayed. In the case where the [Return] button 1022 has not been pressed down, the processing proceeds to step 522 and whether or not an [OK] button 1023 has been pressed down is determined. Then, in the case where the [OK] button 1023 has not been pressed down, the processing returns to step 518. In the case where the [OK] button 1023 has been pressed down, the present processing is terminated.

The above is the contents of the setting processing to transfer received fax data to the file server 102.

Next, the "transfer/printing setting" that is set in accordance with the setting processing (flowcharts in FIGS. 5A to 5C) to print and transfer received fax data described above is explained. FIG. 11 is a diagram showing an example of the contents that are set as the "transfer/printing setting". On a line 1101, the host name of the file server 102 that is input in the Host name input box 701 on the File server setting screen 700 is described. On a line 1102, the starting point of the folder path that is input in the Folder path input box 702 on the File server setting screen 700 is described. On a line 1103, the user name to log in to the file server 102 that is input in the User name input box 703 on the File server setting screen 700 is described. On a line 1104, the password to log in to the file server 102 that is input in the Password input box 704 on the File server setting screen 700 is described. On a line 1105, the setting rule of the file name that is set on the File name setting screen 800 is described. In the example in FIG. 11, the file name is set by using the separator of [_] (under bar) in the order of [registered name], [fax number], and [date and time]. On a line 1106, the setting rule of the folder path that is set on the Folder path setting screen 900 is described. These pieces of information are stored in the HDD 214 as the "transfer/printing setting" in the format, such as CSV and XML.

Next, the address book that is stored in the address book storage unit 414 of the native function unit 410 is explained. FIG. 12 is a diagram showing an example of the registered contents of the address book. Address ID 1201 is the ID capable of uniquely identifying each address that is registered in the address book. Name 1202 is the name of each address that is registered in the address book. Fax number 1203 is the fax number of each address that is registered in the address book. In the case where the image data that is read by the scanner 222 is transmitted by fax from the MFP 101 via the PSTN 110, it is possible to eliminate effort and time spent specifying the address by referring to the address book data as shown in FIG. 12. It may also be possible to resister the address of an electronic mail, the address of file transmission (FTP, SMB, WebDAV), etc., besides the address of fax transmission.

Figure 13:
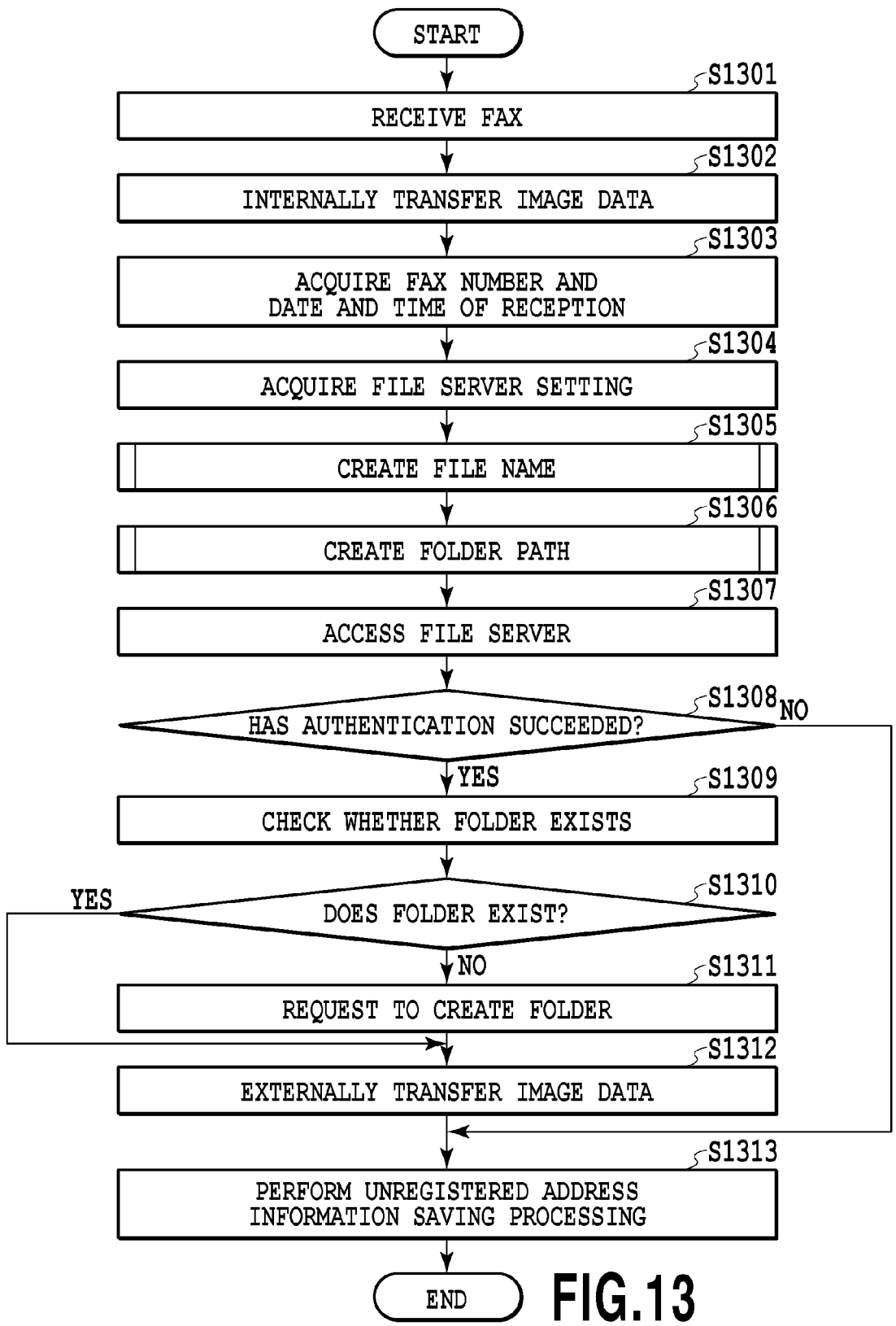
FIG. 13 is a flowchart showing a flow from transferring received fax data to a file server until saving unregistered address information.

Subsequently, a flow of processing from the MFP 101 transferring received fax data to the file server 102 until the fax number of the fax data is saved as unregistered address information in the case where the fax number is not registered in the address book is explained in detail. FIG. 13 is a flowchart showing a flow of processing from transferring received fax data to the file server 102 until unregistered address information is saved. The series of processing is implemented by the CPU 211 executing the control program stored in the HDD 214 of the MFP 101 after developing the program onto the RAM 213.

At step 1301, image data is received by fax by the fax reception unit 411. The image data (fax data) received by fax is sent to the first transfer unit 412.

At step 1302, the received fax data is internally transferred by FTP to the second reception unit 422 of the fax transfer function unit 420 by the first transfer unit 412. The internally transferred fax data is further delivered to the second transfer unit 421.

At step 1303, in the second transfer unit 421 of the fax transfer function unit 420, the fax number of the source of transmission and the date and time of reception are acquired from the control file that is transferred along with the fax data.

At step 1304, in the second transfer unit 421, the contents of the file server setting included in the above-described "transfer/printing setting" are acquired.

Figure 14:
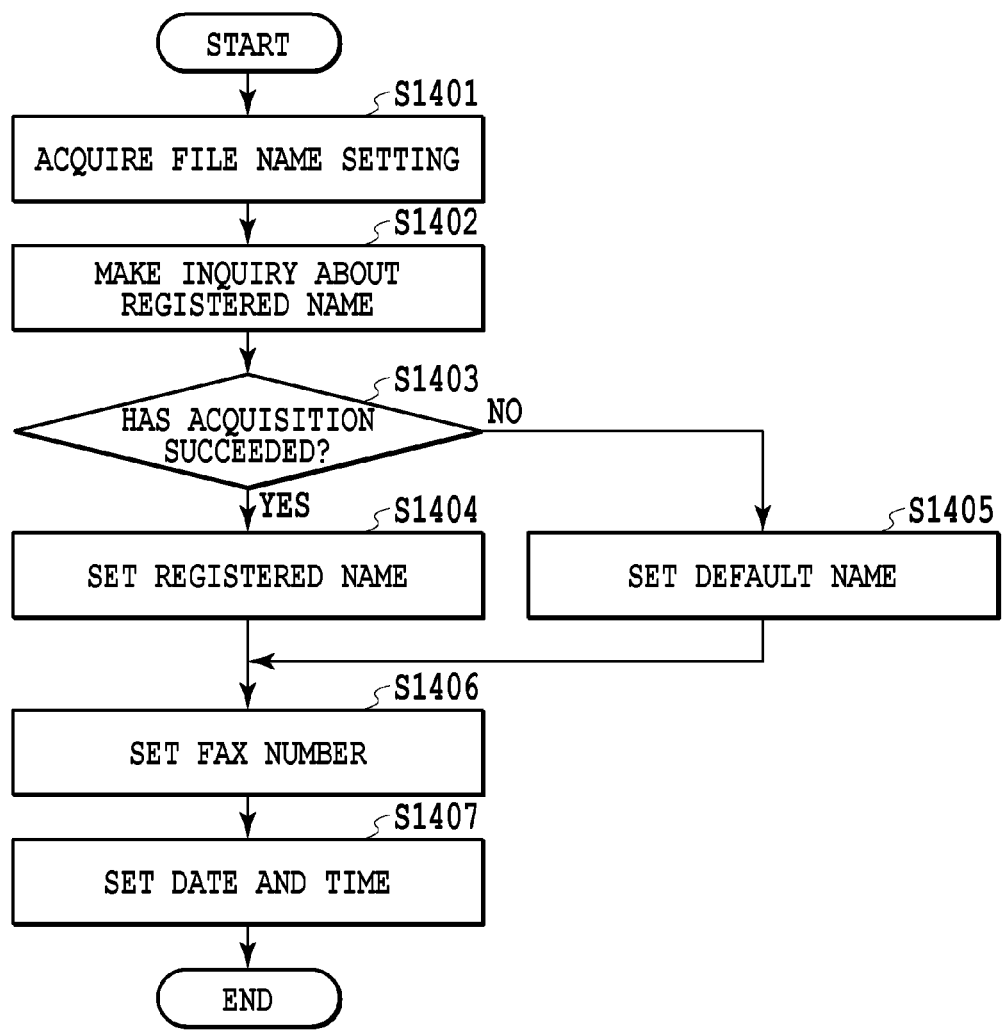
FIG. 14 is a flowchart showing details of file name creation processing in a second transfer unit.

At step 1305, in the second transfer unit 421, a file name that is set for the received fax data is created. FIG. 14 is a flowchart showing details of file name creation processing (S1305) in the second transfer unit 421.

At step 1401, the file name setting included in the above-described "transfer/printing setting" is acquired.

At step 1402, an inquiry is made to the address book storage unit 414 about the name that is registered in association with the fax number of the source of transmission.

At step 1403, whether or not the acquisition of the registered name from the address book storage unit 414 has succeeded is determined, and in the case where the acquisition of the registered name has succeeded, the processing proceeds to step 1404, and in the case where the acquisition of the registered name has failed (e.g., in the case where the fax number of the source of transmission is not registered in the address book), the processing proceeds to step 1405.

At step 1404, the acquired registered name is set as part of the file name.

At step 1405, a default name is set as part of the file name. The default name is, for example, a character string of "no name".

At step 1406, the fax number acquired at step 1803 is set as part of the file name.

At step 1407, the date and time of reception acquired at step 1803 is set as part of the file name. The above is the contents of the file name creation processing. Each setting at steps 1404 to 1407 is performed in accordance with the contents of the file name setting acquired at step 1401. Explanation is returned to the flow in FIG. 13.

Figure 15:
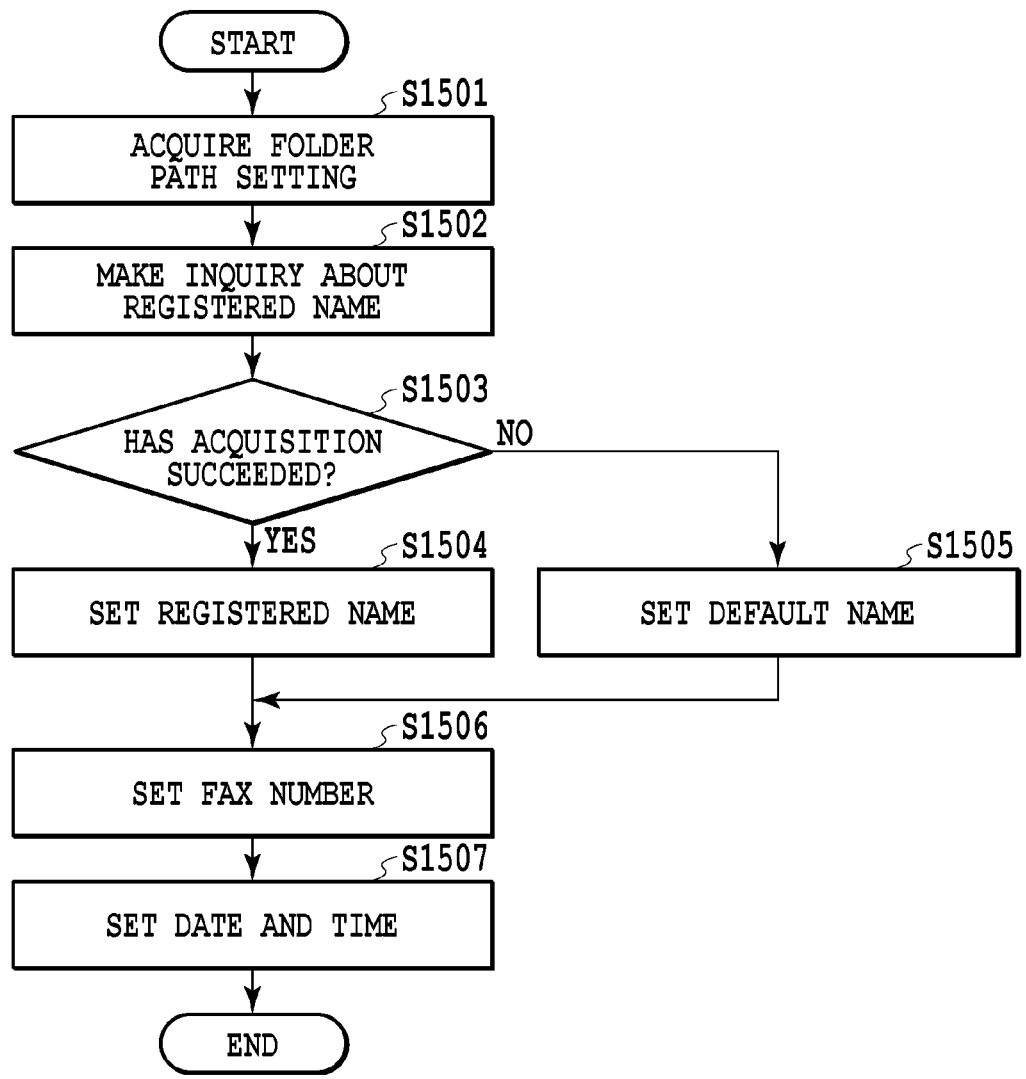
FIG. 15 is a flowchart showing details of folder path creation processing in the second transfer unit.

At step 1306, in the second transfer unit 421, a folder path for specifying the storage destination of the received fax data is created. FIG. 15 is a flowchart showing details of folder path creation processing (S1306) in the second transfer unit 421.

At step 1501, the folder path setting included in the above-described "transfer/printing setting" is acquired.

At step 1502, an inquiry is made to the address book storage unit 414 about the name that is registered in association with the fax number of the source of transmission. In the case where the registered name has already been acquired at step 1402 in the flow in FIG. 14 described previously, this step may be omitted.

At step 1503, whether or not the acquisition of the registered name from the address book storage unit 414 has succeeded is determined and in the case where the acquisition of the registered name has succeeded, the processing proceeds to step 1504, and in the case where the acquisition of the registered name has failed (e.g., in the case where the fax number of the source of transmission is not registered in the address book), the processing proceeds to step 1505.

At step 1504, the acquired registered name is set as part of the folder path.

At step 1505, a default name is set as part of the folder path. The default name is, for example, a character string of "no name".

At step 1506, the fax number acquired at step 1303 is set as part of the folder path.

At step 1507, the date and time of reception acquired at step 1303 is set as part of the folder path.

The above is the contents of the folder path creation processing. Each setting at steps 1504 to 1507 is performed in accordance with the contents of the folder path setting acquired at step 1501. Explanation is returned to the flow in FIG. 13.

At step 1307, the second transfer unit 421 accesses the file server 102. Then, the second transfer unit 421 transmits the user name and the password included in the file server setting acquired at step 1304 to the file server 102 and receives the results of authentication by the file server 102.

At step 1308, in the second transfer unit 421, whether or not the received authentication results indicate that the authentication has succeeded (the login to the file server 102 has succeeded) is determined. In the case where the authentication has succeeded, the processing proceeds to step 1309, and in the case where the authentication has failed, the present processing is terminated.

At step 1309, the second transfer unit 421 makes an inquiry to the file server 102 about whether or not the folder indicated by the folder path created at step 1306 exists.

At step 1310, the processing is classified in accordance with the results of the inquiry. In the case where the folder that is identified by the above-described folder path does not exist, the processing proceeds to step 1311 and in the case where the folder exists, the processing proceeds to step 1312.

At step 1311, the second transfer unit 421 requests the file server 102 to create the folder indicated by the folder path created at step 1306.

At step 1312, the second transfer unit 421 externally transfers the fax data to the file server 102. Then, in the file server 102, the fax data is stored in the folder indicated by the folder path created at step 1306.

At step 1313, the unregistered address management unit 423 performs processing to save the fax number or the like as unregistered address information (unregistered address information saving processing) in the case where the fax number of the received fax data is not registered in the address book.

The above is the contents of the processing until the MFP 101 transfers the received fax data to the file server 102.

<Unregistered Address Information Saving Processing>

Figure 16:
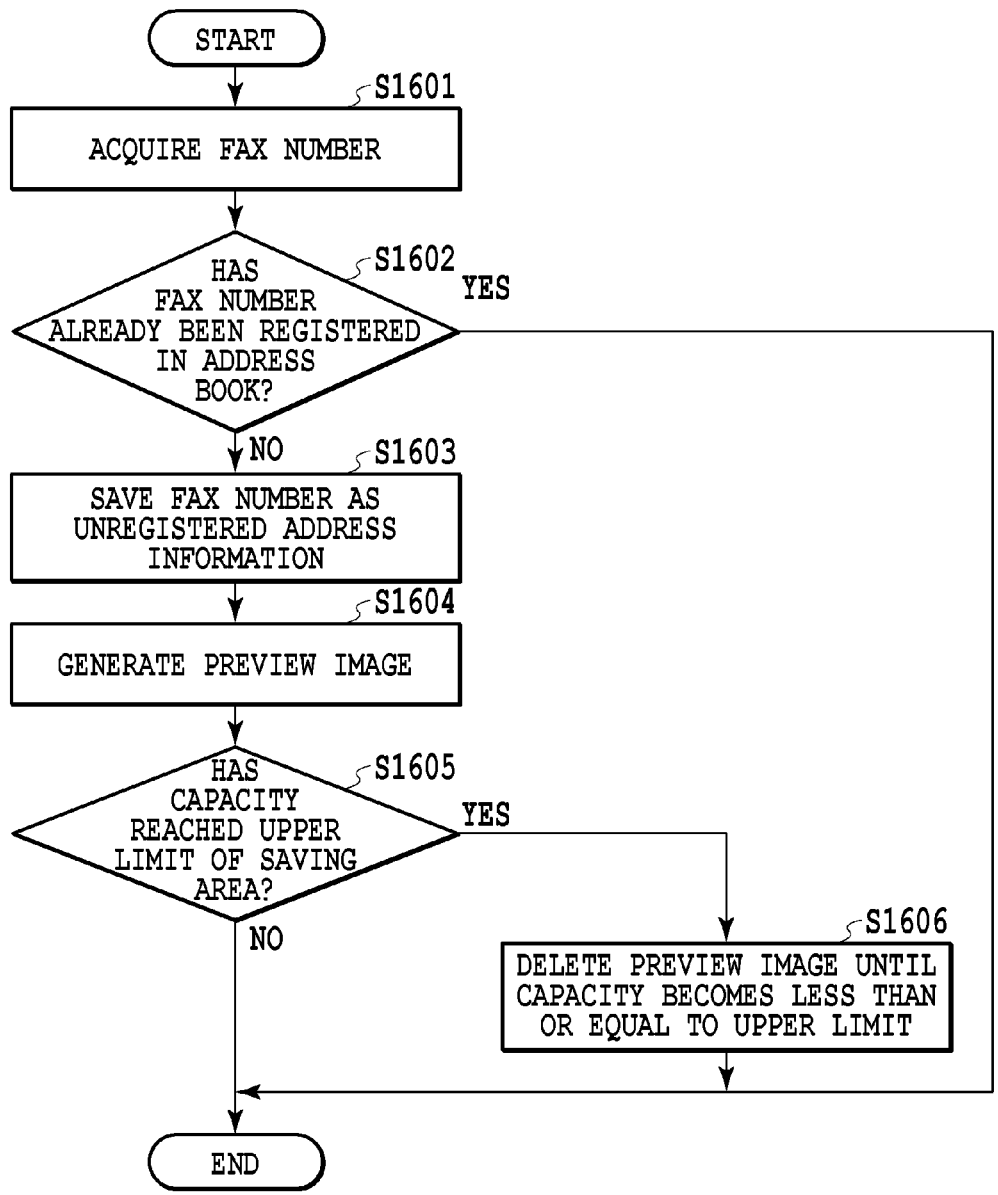
FIG. 16 is a flowchart showing a flow of unregistered address information saving processing.

Subsequently, the unregistered address information saving processing that is performed at step 1313 in the flow in FIG. 13 is explained in detail. FIG. 16 is a flowchart showing a flow of the unregistered address information saving processing.

At step 1601, the fax number of the source of transmission of the received fax data is acquired.

At step 1602, whether the fax number acquired at step 1601 is already registered in the address book data is determined. As a determination method, for example, it may also be possible to compare the fax number with the already-registered numbers after removing symbols or the like, or to compare by using only the number of digits that are thought to be valid as the fax number, in addition to the method of determining that the fax number is already registered in the case where the fax number perfectly coincides with the already-registered number. Further, it may also be possible not to perform determination from the beginning in the case where the number of digits are thought to be invalid as the fax number. In the case where it is determined that the fax number is already registered in the address book data, the present processing is terminated. In the case where it is determined that the fax number is not registered in the address book data, the processing proceeds to step 1603.

At step 1603, the fax number acquired at step 1601 is saved as unregistered address information and, for example, is managed in a list (hereinafter, referred to as an "unregistered address list"). At this time, it may also be possible to save and manage the fax number in association with another piece of information, for example, the date and time of reception, the number of pages, the name of the source of transmission, etc., as described above. In the present embodiment, explanation is given on the assumption that the fax number is saved redundantly and added to the above-described list even in the case where the same fax number is already saved as unregistered address information, but it may also be possible not to save or add the fax number in the case where, for example, the same number already exists in the unregistered address list.

At step 1604, the preview image generation unit 424 is given instructions to generate preview image data and the preview image data corresponding to the received fax data is generated. It may also be possible to generate the preview image data for all the pages of the received fax data, or to generate for the number of pages (e.g., for the first three pages), which are part of all the pages. The preview image is used as information by which a user determines whether it is necessary to register the unregistered fax number in the address book data, and therefore, it is possible to limit the number of preview images to that for the number of pages necessary for the determination. Further, by limiting the number of pages for which the preview image is generated, it is possible to suppress the capacity of the HDD 214 that is used. Furthermore, the preview image is required only to have a resolution with which the contents thereof can be checked, and therefore, it may also be possible to generate a small preview image by reducing the size thereof in accordance with the necessity. The data of the generated preview image is stored in a preview image saving area within the HDD 314.

At step 1605, whether the total capacity of all the preview image data corresponding to each piece of the unregistered address information saved in the unregistered address list has exceeded the upper limit of the preview image saving area is determined. In the case where the upper limit of the preview image saving area has been exceeded, the processing proceeds to step 1606. In the case where the upper limit of the preview image saving area has not been exceeded, the present processing is terminated.

At step 1606, the already-existing preview image data within the preview image saving area is deleted until a value that does not exceed the upper limit of the preview image saving area is reached. At this time, the preview image data is deleted in the order, for example, from the preview image data the date and time of reception of which is the oldest. Further, it may also be possible to delete the preview image data in the order from the preview image data corresponding to the older date and time of reception in the case where there is a plurality of pieces of unregistered address information of the same fax number. Alternatively, it may also be possible to adopt a method of deleting the page of the preview image data in the order from the final page (here, the third page) for all the unregistered address information, and then after all the final pages are deleted, deleting the previous page (here, the second page).

The above is the contents of the unregistered address information saving processing.

FIG. 17 is a diagram showing an example of a screen (unregistered address list screen) to display in a list unregistered address information that is saved and added to the unregistered address list at step 1603 described above. The screen makes a transition into an Unregistered address list screen 1700 by pressing down the [To unregistered address saving] button 603 on the Status display screen 600 described previously. However, the button to make a transition into the present screen may be on any of the screens.

In a display box 1701, unregistered address information (here, each piece of information, such as the date and time of reception, the fax number of the source of transmission not registered in the address book, and the number of pages) that is added to the unregistered address list is displayed in a list. In the example in FIG. 17, the unregistered address information is displayed in the order from the unregistered address information the date and time of reception of which is the most recent, but any display order is acceptable. Further, it may also be possible to provide a mechanism to sort the information in the ascending or descending order for each item so that the information can be displayed in the form suitable to a user. As the information that is displayed in a list, at least the fax number of the source of transmission not registered is necessary, but the date and time of reception and the number of pages are optional. Further, it may also be possible to display another piece of information together, such as the name of the source of transmission.

Figure 18:
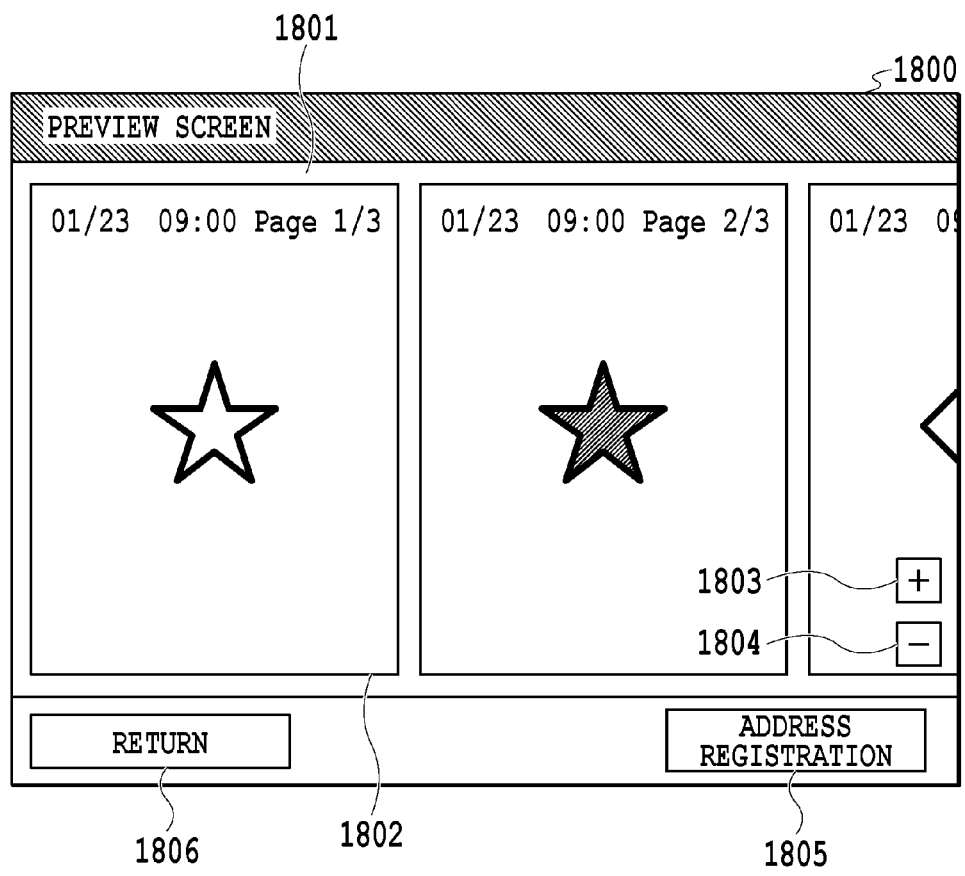
FIG. 18 is a diagram showing an example of a Preview screen.

A [Preview] button 1702 is a button for displaying a preview image corresponding to the unregistered address information selected from the display box 1701 based on the instructions of a user. The unregistered address information being selected is highlight-displayed as shown in FIG. 17. It may also be possible to display the unregistered address information being selected by, for example, checking a checkbox, in place of the highlight display. FIG. 18 is a diagram showing an example of a preview screen that is displayed by pressing down the [Preview] button 1702. A Preview screen 1800 shown in FIG. 18 shows the case where the button 1702 is pressed down while the third unregistered address information (Date and time of reception: 01/23_9:00, Fax number of source of transmission: 0312345679, Number of pages: 3) from the top in the display box 1701 is being selected. A preview area 1801 on the Preview screen 1800 is an area that displays a preview image corresponding to the selected unregistered address information and a preview image 1802 generated at step 1604 described above is displayed. In the case where a plurality of pages (here, three pages in total) of the preview image corresponding to the selected unregistered address information exists, as shown in FIG. 18, the preview image 1802 of each page is displayed, for example, side by side in the horizontal direction. In order to check a page that will appear later, it is sufficient to move the preview image to be displayed by, for example, a swipe operation on a touch panel. In the case where there exists only one page of the preview image corresponding to the unregistered address information, the one preview image is displayed in the preview area 1801, for example, in such a manner that the left side of the image aligns with the left margin of the preview area 1801. The preview image 1802 for one page is enlarged or reduced in accordance with the height of the screen. Here, as an example, the configuration is such that a plurality of pages is arranged in the horizontal direction and the page is moved to another page by the swipe operation, but it may also be possible to arrange the pages in the vertical direction, or to arrange a page switch button so that the pages are switched in accordance with the pressing-down of the button. A [+] button 1803 is a button for displaying an enlarged preview image. It may also be possible to design the configuration so that each time the [+] button 1803 is pressed down, the preview image is enlarged by a fixed ratio (e.g., in increments of 10%), or so that the displays are switched in order of the size, such as the size in the case where the image width is matched with the screen width and the actual size. A [−] button 1804 is a button for displaying a reduced preview image. Like the [+] button 1803, each time the button is pressed down, the preview image that is displayed is reduced. An [Address registration] button 1805 is a button for displaying a screen (address registration screen) for registering the unregistered address information (Fax number of source of transmission) corresponding to the preview image 1802 being displayed within the preview area 1801 in the address book data. In the case where an [Address registration] button 1703 within the Unregistered address list screen 1700 in FIG. 17 is pressed down, an address registration screen for registering the unregistered address information being selected within the display box 1701 is also displayed. The address registration screen will be described later. A [Return] button 1806 is a button for returning the screen to the Unregistered address list screen 1700.

The [Return] button 1704 is a button for cancelling the Unregistered address list screen 1700 and returning the display to the previous screen display.

It may also be possible to provide a button other than the [Address registration] button within the Unregistered address list screen 1700 and/or the Preview screen 1800 described above. For example, it may also be possible to additionally provide a button for implementing a function that can be provided to a user by using the unregistered address information. As an example of such a button for implementing a function, a button for preventing printing and transfer of fax data received from a specific fax number, and a button for registering the specific fax number in order to reject reception can be thought. Further, it may also be possible to provide a button for reading and displaying specific fax data among the received fax data transferred to and saved in the file server 102. In other words, it may also be possible to display the image of the fax data read from the file server 102 in place of the above-described preview image.

<Address Registration Processing>

Figure 19:
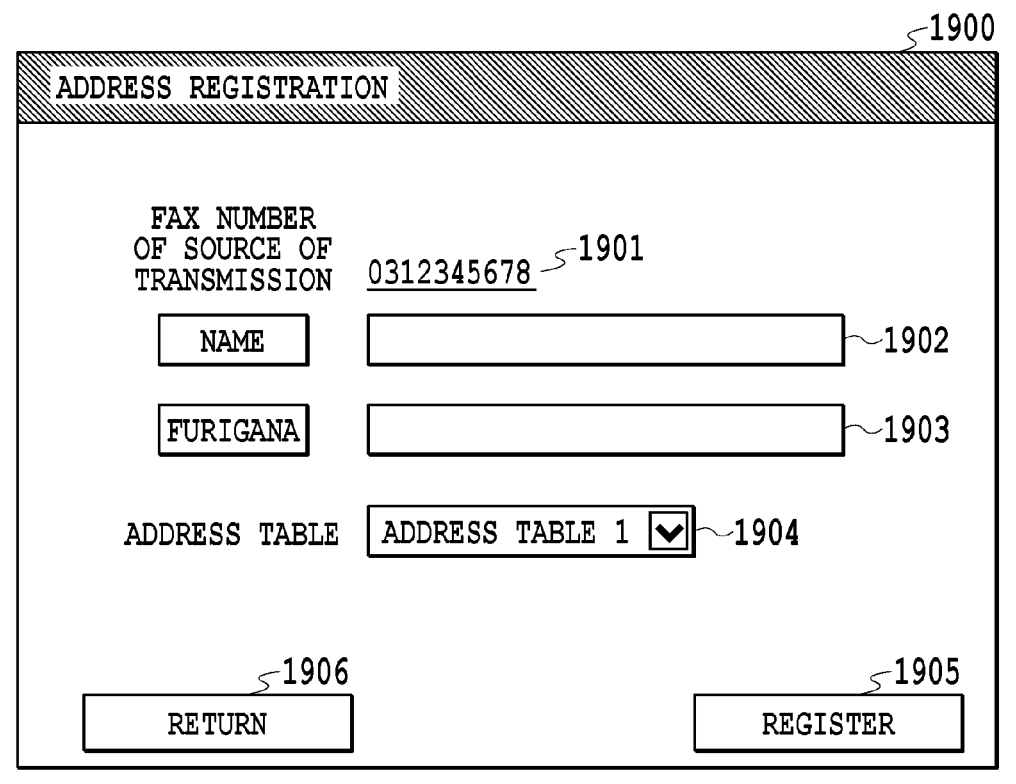

Subsequently, the address registration processing that is performed by pressing down the above-described [Address registration] buttons 1703/1805 is explained in detail. FIG. 19 is a diagram showing an example of an address registration screen that is displayed by pressing down one of the [Address registration] buttons described above. Here, it is assumed that the [Address registration] button is pressed down in the state where the unregistered address information displayed at the top (Date and time of reception: 01/24_10:20, Fax number of source of transmission: 0312345678, Number of pages: 1) is selected from among the unregistered address information displayed in the list in the display box 1701 on the above-described Unregistered address list screen 1700. In a display box 1901, the selected fax number of the source of transmission is displayed. Here, the display is "0312345678". In the display box 1901, the selected fax number of the source of transmission is displayed directly and a user cannot change the display, but it may also be possible to display the fax number in the form that a user can edit. In a Name input box 1902, a name is input, which is necessary at the time of registering the fax number in the address book data and which is registered in association with the fax number. In a Furigana (Japanese phonetic syllabary character that is written to show the reading of a Chinese character) input box 1903, Kana showing the reading of the name that is registered in association with the fax number is input. The name and Kana are input by using a software keyboard or the like. In an Address table selection box 1904, an address table in which information is registered is selected from among a plurality of address tables, which is a group for making it easier for a user to classify and mange the address book in a pull-down display. As the information that is registered in the address book data, only the fax number of the source of transmission and the name of the source of transmission are necessary. Consequently, neither the Furigana input box 1903 nor the Address table selection box 1904 is the indispensable item. It may also be possible to design the screen so that it is possible to input information other than the information shown on an Address registration screen 1900 in FIG. 19. A [Registration] button 1905 is a button for performing processing to register the information in the address book data by using the information input and selected in each of the input boxes 1901 to 1903 and the selection box 1904 described above. It may also be possible to design the Address registration screen 1900 so that the information that a user does not need to input or select among the information necessary for registration in the address book data is not displayed on the Address registration screen 1900 and registration is performed by using default values. Then, in the case where the registration processing in the address book data is completed, in the unregistered address management unit 423, the unregistered address information having the same number as the registered fax number is deleted from the unregistered address list. Details of the processing to delete unregistered address information will be described later.

A [Return] button 1906 is a button for aborting the processing to register the information in the address book data and returning the screen to the Unregistered address list screen 1700.

<Deletion of Unregistered Address Information>

Figure 20:
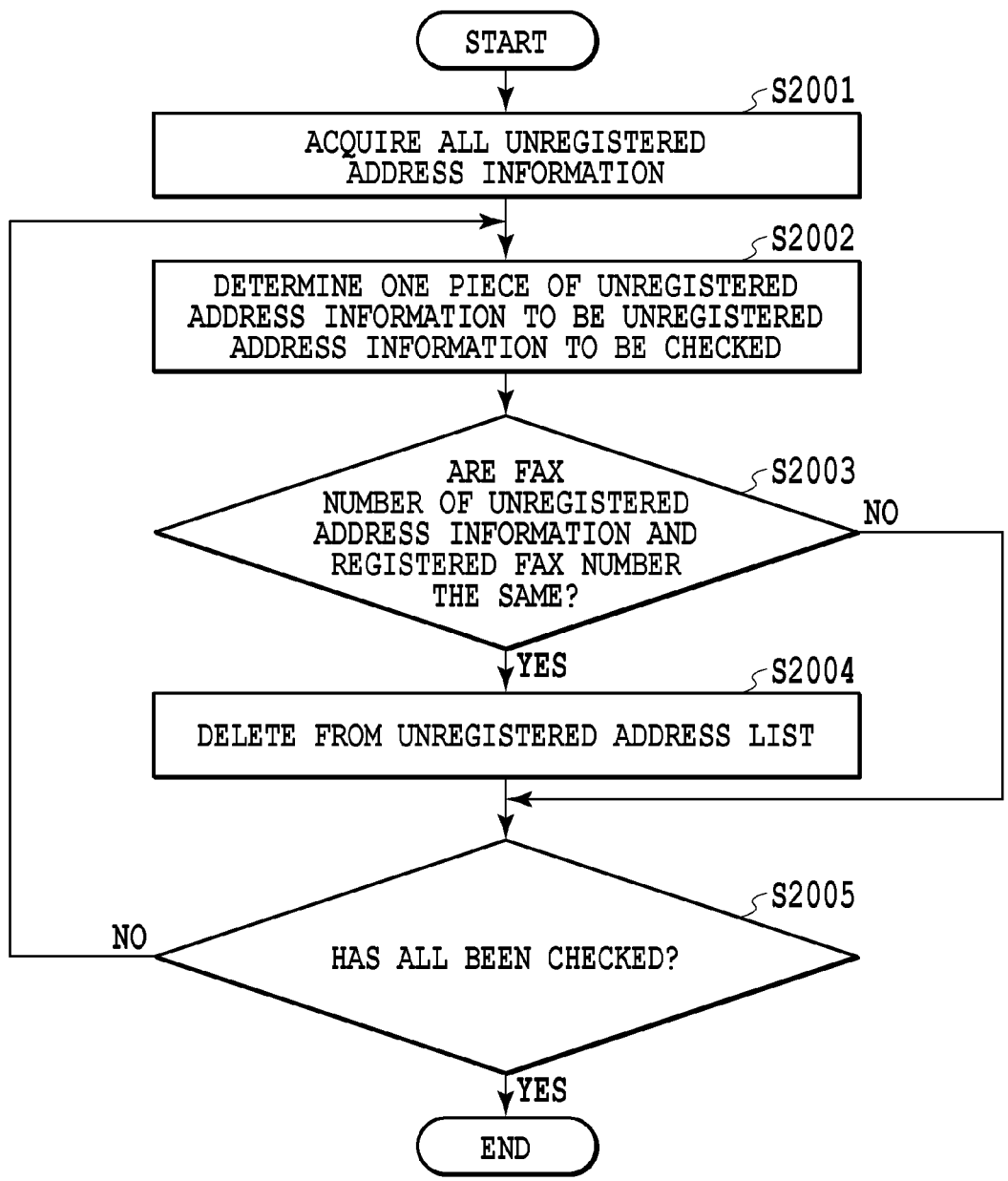
FIG. 20 is a flowchart showing a flow of deletion processing of unregistered address information.

Next, the processing to delete unregistered address information that is performed in the unregistered address management unit 423 is explained in detail. FIG. 20 is a flowchart showing a flow of the processing to delete unregistered address information.

At step 2001, all the unregistered address information that is managed in the unregistered address list is acquired. In other words, all the unregistered address information that is displayed in the list in the display box 1701 on the Unregistered address list screen 1700 described previously is acquired.

At step 2002, among all the unregistered address information acquired at step 2001, an arbitrary piece of information (not determined yet at step 2003 that follows) is determined to be unregistered address information to be checked.

At step 2003, the fax number registered in the address book data by pressing down the [Registration] button 1905 is compared with the fax number of the unregistered address information determined at step 2002 and whether both coincide with each other is determined. In the case where both coincide with each other, the processing proceeds to step 2004 and in the case where both do not coincide with each other, the processing proceeds to step 2005.

At step 2004, the unregistered address information determined at step 2002 is deleted from the unregistered address list.

At step 2005, whether the determination processing at step 2003 has been performed for all the unregistered address information within the unregistered address list is determined. In the case where there is unregistered address information on which the processing has not been performed yet, the processing returns to step 2002, and the processing is continued by taking the next unregistered address information to be the target. In the case where the determination processing at step 2003 has been performed for all the unregistered address information within the unregistered address list, the present processing is terminated.

The above is the contents of the processing to delete unregistered address information.

Modification Example 1

The Preview screen 1800 shown in FIG. 18 is a screen to display a preview image corresponding to one piece of unregistered address information selected from the display box 1701 on the Unregistered address list screen 1700. In a modification example 1, a preview screen designed so as to simultaneously display preview images corresponding to a plurality of pieces of unregistered address information is explained.

Figure 21:
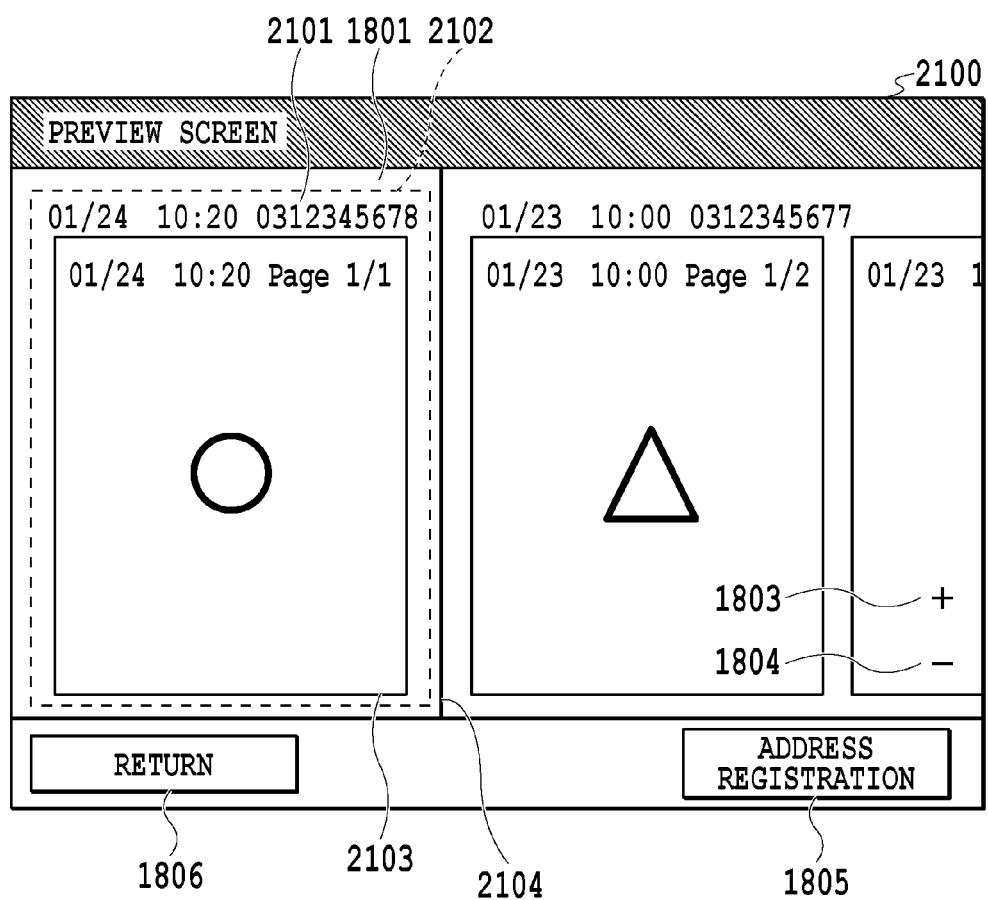
FIG. 21 is a diagram showing an example of a Preview screen according to a modification example 1.

FIG. 21 is a diagram showing an example of a preview screen displaying preview images corresponding to a plurality of pieces of unregistered address information. Explanation of the contents in common to those of the Preview screen 1800 in FIG. 18, which has already been explained, is omitted, and in the following, different points are explained mainly.

On a Preview screen 2100 shown in FIG. 21, a state is displayed in the case where the [Preview] button 1702 is pressed down while the unregistered address information (Date and time of reception: 01/24_10: 20, Fax number of source of transmission: 0312345678, Number of pages: 1) located at the top of the display box 1701 is being selected. On the Preview screen 2100, a preview image for one page, which corresponds to the unregistered address information being selected, and preview images for two pages, which correspond to the unregistered address information (the second unregistered address information from the top in the display box 1701) below the unregistered address information being selected are displayed. A label 2101 within the preview area 1801 is a label displaying the unregistered address information corresponding to a preview image 2103. In the case where preview images corresponding to a plurality of pieces of unregistered address information are displayed simultaneously, it becomes hard to know which information the preview image corresponds to, and therefore, the date and time of reception and the number of the source of transmission included in each piece of unregistered address information are associated with the preview image and displayed as a label. A broken line frame 2102 is a highlight display for notifying a user that the preview image is the preview image (the preview image being selected on the Preview screen 2100) of the unregistered address information that is to be registered by pressing down the [Address registration] button 1805. A vertical solid line 2104 is a boundary line that is displayed to make it easy to see the boundary between different pieces of unregistered address information. The number of pages of the preview image may be different for different pieces of unregistered address information, and therefore, in the case where the preview images are simply arranged side by side, it becomes hard to know the portion at which unregistered address information switches to another. Because of this, in the example in FIG. 21, the portion at which unregistered address information switches to another is shown by making the space between neighboring pages of different preview images larger than the space between neighboring pages of the same preview image, and by drawing the boundary line 2104 between neighboring pages of different preview images. It is also possible to represent the boundary of the unregistered address information by a method other than the method like this, for example, by a method of changing the color of the background for each piece of unregistered address information.

Modification Example 2

Figure 22:
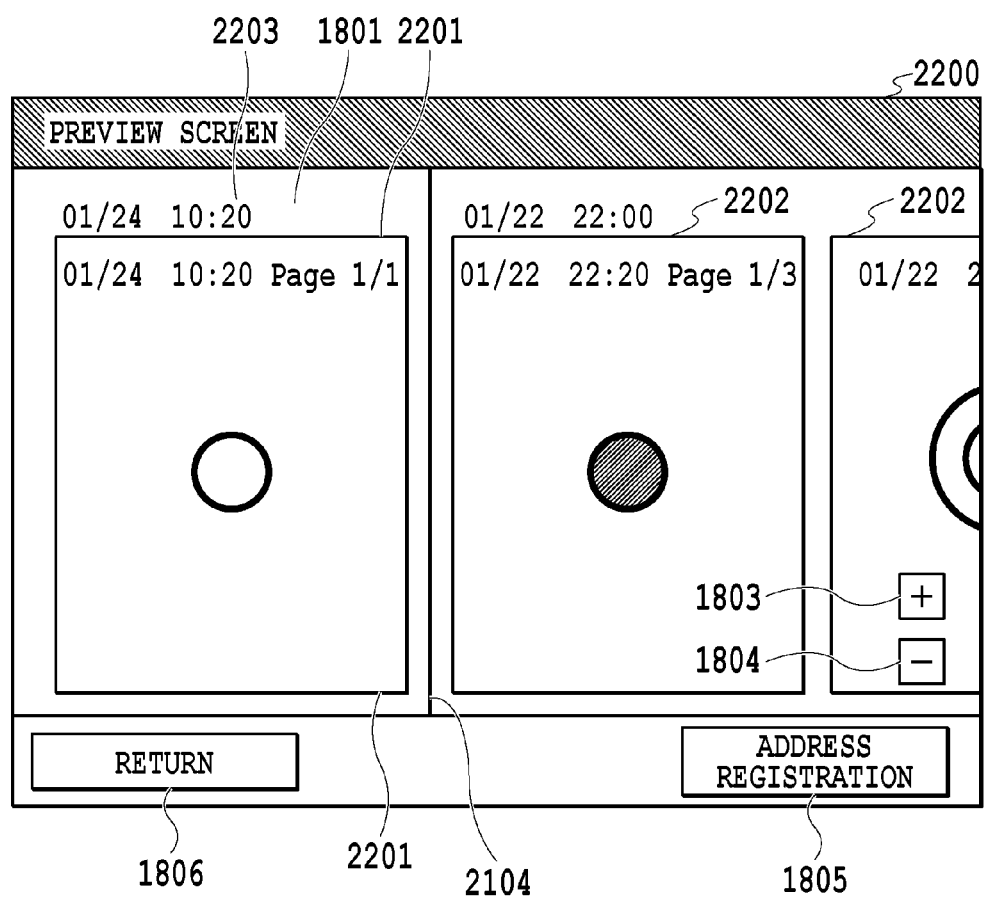
FIG. 22 is a diagram showing an example of a Preview screen according to a modification example 2.

Next, a preview screen on which preview images corresponding to a plurality of pieces of unregistered address information having the same fax number are displayed simultaneously is explained as a modification example 2. FIG. 22 is a diagram showing an example of a preview screen on which preview images of a plurality of pieces of unregistered address information having the same fax number are displayed simultaneously. Explanation of the contents in common to those of the Preview screen 1800 in FIG. 18 already explained is omitted and in the following, different points are explained mainly. A Preview screen 2200 shown in FIG. 22 shows a state in the case where the [Preview] button 1702 is pressed down while the unregistered address information (Date and time of reception: 01/24_10:20, Fax number of source of transmission: 0312345678, Number of pages: 1) at the top in the display box 1701 on the Unregistered address list screen 1700 is being selected. Then, on the Preview screen 2200, in addition to a preview image 2201 for one page, which corresponds to the unregistered address information at the top being selected, preview images 2202 for two pages of three pages are displayed, which correspond to the unregistered address information that has the same fax number as that of the unregistered address information at the top and which is the fifth unregistered address information from the top. A label 2203 within the preview area 1801 is a label displaying the date and time of reception included in the selected unregistered address information. The preview images of the unregistered address information having the same fax number as that of the selected unregistered address information are displayed simultaneously, and therefore, the information on the fax number is not included in the label 2203. Further, the boundary line 2104 showing the portion at which unregistered address information switches to another is displayed, but the frame 2102 showing the unregistered address information being selected is not displayed because not necessary.

As above, according to the present embodiment, by receiving fax data from all the sources of transmission and saving the fax data in a storage, such as a file server, it is possible for a user to check later what kind of fax data has been received. Further, by displaying in a list the fax numbers not registered in the address book data among the fax numbers of the source of transmission included in the TSI signal that is transmitted from the calling side, it is possible for a user to register only necessary numbers in the address book data in a form intended by the user him/herself. Furthermore, by making it possible to refer to the preview image of the fax data relating to the fax number not registered in the address book data, it is possible for a user to determine the necessity of registration more appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible for a user to more appropriately determine whether to register a number of fax data in the address book, the number of which is not registered in the address book.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-087586, filed Apr. 22, 2015 which is hereby incorporated by reference herein in its entirety.

What is claimed is:

1. A fax data management system comprising:
a processor; and
a memory coupled with the processor, the memory containing instructions that, when executed by the processor, cause the processor to perform a process comprising:
managing, in a case where a fax number of received fax data is not registered in address book data in which a name and a fax number of a source of transmission are registered in association with each other, the fax number of the received fax data as unregistered address information;
generating a preview image from the received fax data;
displaying, on a display, the managed unregistered address information and the preview image generated from the received fax data corresponding to the unregistered address information; and
registering a fax number, the fax number being selected from the displayed unregistered address information based on a user's instruction, the selected fax number being registered into the address book data, the registered fax number being associated with a name of a source of transmission.

2. The fax data management system according to claim 1, wherein, in a case where the selected fax number is registered in the address book data, the processor further performs deleting the same fax number as the registered fax number from the unregistered address information.

3. The fax data management system according to claim 1, wherein the processor further performs saving the generated preview image data in a storage, and wherein
the processor displays the saved preview image data saved in the storage as the preview image generated from the received fax data corresponding to the unregistered address information.

4. The fax data management system according to claim 1, wherein
the preview image data is generated from part of all the pages of the received fax data.

5. The fax data management system according to claim 1, wherein
the preview image is an image obtained by reducing image of the received fax data.

6. The fax data management system according to claim 3, wherein an upper limit is set in advance to the capacity of the storage, and wherein, in a case the generated preview image data exceeds the upper limit, the processor further performs deleting already-existing preview image data saved in the storage.

7. The fax data management system according to claim 1, wherein
the processor simultaneously displays, on the display, preview images corresponding to a plurality of pieces of unregistered address information.

8. The fax data management system according to claim 1, wherein
the processor simultaneously displays, on the display, preview images corresponding to unregistered address information having the same fax number as a specific fax number selected by a user.

9. The fax data management system according to claim 1, wherein the processor further performs saving all received fax data in a file server.

10. A fax data management method comprising the steps of:
determining whether a fax number of received fax data is registered in address book data in which a name and a fax number of a source of transmission are registered in association with each other;
managing, in a case where it is determined that the fax number of the received fax data is not registered in the address book data, the fax number of the received fax data as unregistered address information;
generating a preview image from the received fax data;
displaying the managed unregistered address information and the preview image generated from the received fax data corresponding to the unregistered address information; and
registering a fax number, the fax number being selected from the displayed unregistered address information based on a user's instruction, the selected fax number being registered into the address book data, the registered fax number being associated with a name of a source of transmission.

11. A non-transitory computer readable storage medium storing a program for causing a computer to perform a process comprising:
determining whether a fax number of received fax data is registered in address book data in which a name and a fax number of a source of transmission are registered in association with each other;
managing, in a case where it is determined that the fax number of the received fax data is not registered in the address book data, the fax number of the received fax data as unregistered address information;
generating a preview image from the received fax data;
displaying the managed unregistered address information and the preview image generated from the received fax data corresponding to the unregistered address information; and
registering a fax number, the fax number being selected from the displayed unregistered address information based on a user's instruction, the selected fax number being registered into the address book data, the registered fax number being associated with a name of the source of transmission.

* * * * *